(12) United States Patent
Watanabe et al.

(10) Patent No.: US 11,827,727 B2
(45) Date of Patent: Nov. 28, 2023

(54) PHOTO-ALIGNMENT POLYMER, BINDER COMPOSITION, BINDER LAYER, OPTICAL LAMINATE, OPTICAL LAMINATE MANUFACTURING METHOD, AND IMAGE DISPLAY DEVICE

(71) Applicant: FUJIFILM Corporation, Tokyo (JP)

(72) Inventors: Soichiro Watanabe, Kanagawa (JP); Yutaka Nozoe, Kanagawa (JP); Takashi Iizumi, Kanagawa (JP); Akio Tamura, Kanagawa (JP); Tomoaki Yokota, Kanagawa (JP); Keisuke Yoshimasa, Kanagawa (JP); Ayako Matsumoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/055,660

(22) Filed: Nov. 15, 2022

(65) Prior Publication Data

US 2023/0167216 A1 Jun. 1, 2023

(30) Foreign Application Priority Data

Nov. 29, 2021 (JP) .................. 2021-192734
Sep. 21, 2022 (JP) .................. 2022-150177

(51) Int. Cl.
| | | |
|---|---|---|
| C08F 220/58 | (2006.01) | |
| C08L 33/24 | (2006.01) | |
| C09K 19/54 | (2006.01) | |
| G02B 5/30 | (2006.01) | |
| B32B 27/30 | (2006.01) | |
| C09K 19/56 | (2006.01) | |

(52) U.S. Cl.
CPC .......... *C08F 220/585* (2020.02); *C08L 33/24* (2013.01); *C09K 19/542* (2013.01); *G02B 5/3016* (2013.01); *B32B 27/30* (2013.01); *B32B 2457/20* (2013.01); *B32B 2457/202* (2013.01); *B32B 2457/206* (2013.01); *C09K 19/56* (2013.01); *C09K 2019/548* (2013.01); *C09K 2323/02* (2020.08); *C09K 2323/025* (2020.08); *C09K 2323/03* (2020.08); *C09K 2323/035* (2020.08)

(58) Field of Classification Search
None
See application file for complete search history.

(56) References Cited

U.S. PATENT DOCUMENTS

| | | | | |
|---|---|---|---|---|
| 6,649,230 | B1 * | 11/2003 | Seiberle ............ | G02F 1/133711 528/65 |
| 2017/0037173 | A1 * | 2/2017 | Saha ................... | C09K 19/56 |
| 2020/0079885 | A1 * | 3/2020 | Tamura ............... | C08F 20/30 |

FOREIGN PATENT DOCUMENTS

WO 2018/216812 A1 11/2018

* cited by examiner

*Primary Examiner* — Eli D. Strah
(74) *Attorney, Agent, or Firm* — Edwards Neils LLC; Jean C. Edwards, Esq

(57) ABSTRACT

A photo-alignment polymer has a repeating unit represented by Formula (1), in Formula (1), $R^1$ represents a hydrogen atom or a substituent, X represents —O—, —S—, or —$NR^2$—, in which $R^2$ represents a hydrogen atom or a substituent, $L^1$ represents a single bond or a divalent linking group, P represents a photo-aligned group, and A represents an acid-cleavage group which is decomposed by an action of acid to produce a polar group (1)

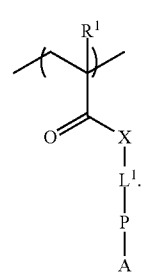

13 Claims, No Drawings

PHOTO-ALIGNMENT POLYMER, BINDER COMPOSITION, BINDER LAYER, OPTICAL LAMINATE, OPTICAL LAMINATE MANUFACTURING METHOD, AND IMAGE DISPLAY DEVICE

CROSS-REFERENCE TO RELATED APPLICATIONS

The present application claims priority under 35 U.S.C. § 119 to Japanese Patent Application No. 2021-192734 filed on Nov. 29, 2021 and Japanese Patent Application No. 2022-150177 filed on Sep. 21, 2022. The above application is applications are hereby expressly incorporated by reference, in their entirety, into the present application.

BACKGROUND OF THE INVENTION

1. Field of the Invention

The present invention relates to a photo-alignment polymer, a binder composition, a binder layer, an optical laminate, an optical laminate manufacturing method, and an image display device.

2. Description of the Related Art

Optical films such as optical compensation sheets or retardation films are used in various image display devices from the viewpoint of solving image coloration or enlarging a viewing angle.

A stretched birefringence film has been used as an optical film, but in recent years, it has been proposed to use an optically anisotropic layer formed of a liquid crystal compound in place of the stretched birefringence film.

In the formation of such an optically anisotropic layer, a photo-alignment film obtained by performing a photo-alignment treatment may be used in order to align the liquid crystal compound.

For example, examples of WO2018/216812A disclose a method of forming an optically anisotropic layer using a photo-alignment polymer KH2 represented by the following formula. The photo-alignment polymer contains a cleavage group which is decomposed by an action of acid to produce a polar group.

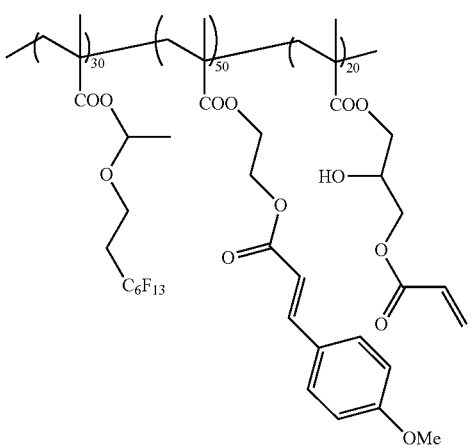

KH2

SUMMARY OF THE INVENTION

The present inventors have conducted studies on the photo-alignment polymer described in WO2018/216812A, and found that aligning properties of the optically anisotropic layer (hereinafter, also abbreviated as "liquid crystal alignment properties") formed on the upper layer of a layer formed using the photo-alignment polymer (hereinafter, also abbreviated as a "lower layer") may be deteriorated depending on the type of the liquid crystal compound. In particular, it was found that there is room for improvement in liquid crystal alignment properties of a disk-like liquid crystal compound.

Therefore, an object of the present invention is to provide a photo-alignment polymer in which liquid crystal alignment properties can be improved, a binder composition, a binder layer, an optical laminate, an optical laminate manufacturing method, and an image display device.

As a result of conducting intensive studies to achieve the above-described object, the present inventors have found that, in a case where a photo-alignment polymer including a photo-aligned group in a side chain and having a repeating unit including a predetermined acid-cleavage group (hereinafter, also referred to as an "acid-cleavage group which is decomposed by an action of acid to produce a polar group") on a terminal side of the side chain relative to the photo-aligned group is used, the liquid crystal alignment properties are improved, and thus completed the present invention.

That is, the present inventors have found that the above-described object can be achieved with the following configuration.

[1] A photo-alignment polymer comprising a repeating unit represented by Formula (1) described later.

[2] The photo-alignment polymer according to [1],
in which the repeating unit represented by Formula (1) described later is a repeating unit represented by Formula (2) described later.

[3] The photo-alignment polymer according to [1] or [2], further comprising a repeating unit having a crosslinkable group.

[4] The photo-alignment polymer according to [3],
in which the repeating unit having a crosslinkable group is a repeating unit represented by Formula (C) described later.

[5] The photo-alignment polymer according to [3] or [4],
in which the crosslinkable group represents a group represented by any one of Formula (C1), . . . , or Formula (C4), which is described later.

[6] The photo-alignment polymer according to any one of [3] to [5],
in which a content a of the repeating unit represented by Formula (1) and a content b of the repeating unit having a crosslinkable group satisfy Expression (D1) described later in terms of mass ratio, $$0.03 \leq a/(a+b) \leq 0.8 \quad (D1).$$

[7] The photo-alignment polymer according to any one of [1] to [6],
in which a weight-average molecular weight is 10000 to 500000.

[8] A binder composition comprising:
the photo-alignment polymer according to any one of [1] to [7];
a binder; and
a photo-acid generator.

[9] A binder layer formed of the binder composition according to [8],
in which a surface has an alignment controllability.
[10] An optical laminate comprising:
the binder layer according to [9]; and
an optically anisotropic layer disposed on the binder layer.
[11] An optical laminate manufacturing method comprising:
generating an acid from the photo-acid generator in a coating film formed of the binder composition according to [8], performing a photo-alignment treatment, and then forming a binder layer; and
performing coating on the binder layer with a polymerizable liquid crystal composition including a polymerizable liquid crystal compound, and then forming an optically anisotropic layer.
[12] An image display device comprising:
the binder layer according to [9]; or
the optical laminate according to [10].
According to the present invention, it is possible to provide a photo-alignment polymer in which liquid crystal alignment properties can be improved, a binder composition, a binder layer, an optical laminate, an optical laminate manufacturing method, and an image display device.

DESCRIPTION OF THE PREFERRED EMBODIMENTS

Hereinafter, the present invention will be described in detail.
The following description of configuration requirements is based on typical embodiments of the present invention, but the present invention is not limited thereto.
In this specification, a numerical range expressed using "to" means a range including numerical values before and after "to" as a lower limit value and an upper limit value.
In addition, in this specification, for each component, one kind of substance corresponding to each component may be used alone, or two or more kinds thereof may be used in combination. Here, in a case where two or more types of substances are used in combination for each component, the content of the component refers to a total content of the substances used in combination unless otherwise specified.
In addition, the bonding direction of a divalent group (for example, —O—CO—) described in this specification is not particularly limited, and for example, in a case where $L^2$ in a "$L^1$-$L^2$-$L^3$" bond is —O—CO—, and a bonding position on the $L^1$ side is represented by *1 and a bonding position on the $L^3$ side is represented by *2, $L^2$ may be *1-O—CO—*2 or *1-CO—O—*2.

Photo-Alignment Polymer

A photo-alignment polymer according to an embodiment of the present invention is a polymer having photo-aligning properties, which has a repeating unit represented by Formula (1) described later. Here, the photo-alignment refers to have a photo-alignment function in which rearrangement or an anisotropic chemical reaction is induced by irradiation with light having anisotropy (for example, plane-polarized light).
In the present invention, as described above, in a case where a photo-alignment polymer including a repeating unit represented by Formula (1) described later, that is, a photo-aligned group in a side chain and having a repeating unit including a predetermined acid-cleavage group on a terminal side of the side chain relative to the photo-aligned group is blended, the liquid crystal alignment properties are improved.

Although the details thereof are not clear, the present inventors have presumed as follows.
Since the photo-alignment polymer according to the embodiment of the present invention has the repeating unit including a photo-aligned group and the repeating unit including an acid-cleavage group in the same side chain, due to the presence of a "group containing a fluorine atom or a silicon atom" (Y in Formulae (B1) and (B2) described later) included in the acid-cleavage group, in a case where the photo-alignment polymer is unevenly distributed on the outermost surface of a lower layer (interface side with an upper layer), not only the acid-cleavage group but also the photo-aligned group are present on the outermost surface. As a result, it is considered that the liquid crystal alignment properties are improved because alignment controllability for the upper layer is maximized with being less affected by other repeating units.
Hereinafter, the repeating units included in the photo-alignment polymer according to the embodiment of the present invention will be described in detail.

Repeating Unit Represented by Formula (1)

The photo-alignment polymer according to the embodiment of the present invention has a repeating unit represented by Formula (1).

In Formula (1), $R^1$ represents a hydrogen atom or a substituent.
Here, the type of the substituent represented as one aspect of $R^1$ is not particularly limited, and examples thereof include known substituents.
Examples of the substituent include a halogen atom, an alkyl group, an alkoxy group, an aryl group, an aryloxy group, a cyano group, a carboxy group, an alkoxycarbonyl group, and a hydroxyl group.
Examples of the halogen atom include a fluorine atom, a chlorine atom, a bromine atom, and an iodine atom, and a fluorine atom or a chlorine atom is preferable.
As the alkyl group, for example, a linear alkyl group having 1 to 18 carbon atoms or a branched or cyclic alkyl group having 3 to 18 carbon atoms is preferable, a linear alkyl group having 1 to 4 carbon atoms is more preferable, and a methyl group or an ethyl group is still more preferable.
As the alkoxy group, for example, an alkoxy group having 1 to 18 carbon atoms is preferable, an alkoxy group having 1 to 4 carbon atoms is more preferable, and a methoxy group or an ethoxy group is still more preferable.
Examples of the aryl group include an aryl group having 6 to 12 carbon atoms, and examples thereof include a phenyl group, an α-methylphenyl group, and a naphthyl group. Among these, a phenyl group is preferable.
Examples of the aryloxy group include a phenoxy group, a naphthoxy group, an imidazoyloxy group, a benzimidazoyloxy group, a pyridine-4-yloxy group, a pyrimidinyloxy group, a quinazolinyloxy group, a purinyloxy group, and a thiophen-3-yloxy group.

Examples of the alkoxycarbonyl group include a methoxycarbonyl group and an ethoxycarbonyl group.

$R^1$ is preferably a hydrogen atom or an alkyl group, and more preferably a hydrogen atom or a methyl group.

In Formula (1), X represents —O—, —S—, or —NR$^2$—, in which $R^2$ represents a hydrogen atom or a substituent.

Here, examples of the substituent represented as one aspect of $R^2$ include the groups exemplified in the above-described substituent represented as one aspect of $R^1$. In addition, $R^2$ is preferably a hydrogen atom or an alkyl group.

X is preferably —O— or —NR$^2$-, more preferably —O— or —NH—, and still more preferably —NH—.

In Formula (1), $L^1$ represents a single bond or a divalent linking group.

Here, examples of the divalent linking group represented as one aspect of $L^1$ include a divalent hydrocarbon group which may have a substituent, a divalent heterocyclic group which may have a substituent, —O—, —S—, —N(Q)—, —CO—, and a group obtained by combining these groups. Q represents a hydrogen atom or a substituent.

Examples of the divalent hydrocarbon group include divalent aliphatic hydrocarbon groups such as an alkylene group having 1 to 10 carbon atoms, an alkenylene group having 1 to 10 carbon atoms, and an alkynylene group having 1 to 10 carbon atoms; and divalent aromatic hydrocarbon groups such as an arylene group.

Examples of the divalent heterocyclic group include divalent aromatic heterocyclic groups. Specific examples thereof include a pyridylene group (pyridine-diyl group), a pyridazine-diyl group, an imidazole-diyl group, thienylene (thiophene-diyl group), and a quinolylene group (quinoline-diyl group).

In addition, examples of the group formed by combining the above-described groups include a group obtained by combining at least two selected from the group consisting of a divalent hydrocarbon group, a divalent heterocyclic group, —O—, —S—, —N(Q)—, and —CO—. Examples thereof include-divalent hydrocarbon group-O— and-divalent hydrocarbon group-N(Q)—.

$L^1$ is preferably a divalent linking group obtained by combining at least two selected from the group consisting of a linear alkylene group having 1 to 10 carbon atoms, which may have a substituent, a branched alkylene group having 3 to 10 carbon atoms, which may have a substituent, a cyclic alkylene group having 3 to 10 carbon atoms, which may have a substituent, an arylene group having 6 to 12 carbon atoms, which may have a substituent, —O—, and —N(Q)—; and more preferably a divalent linking group obtained by combining at least two selected from the group consisting of a linear alkylene group having 1 to 10 carbon atoms, which may have a substituent, a cyclic alkylene group having 3 to 10 carbon atoms, which may have a substituent, —O—, and —NH—.

Examples of the substituent which may be included in the divalent hydrocarbon group (including an alkylene group and the like) and the divalent heterocyclic group described above and the substituent represented as one aspect of Q include the groups exemplified in the above-described substituent represented as one aspect of $R^1$.

In Formula (1), P represents a photo-aligned group.

Here, the photo-aligned group refers to a group having a photo-alignment function in which rearrangement or an anisotropic chemical reaction is induced by irradiation with light having anisotropy (for example, plane-polarized light), and from the viewpoint of excellent alignment uniformity and improved thermal stability and chemical stability, a photo-aligned group in which at least one of dimerization or isomerization is caused by an action of light is preferable.

Suitable examples of the photo-aligned group which is dimerized by the action of light include groups having a skeleton of at least one derivative selected from the group consisting of a cinnamic acid derivative, a coumarin derivative, a chalcone derivative, a maleimide derivative, and a benzophenone derivative.

On the other hand, suitable examples of the photo-aligned group which is isomerized by the action of light include groups having a skeleton of at least one compound selected from the group consisting of an azobenzene compound, a stilbene compound, a spiropyran compound, a cinnamic acid compound, and a hydrazono-β-ketoester compound.

As the photo-aligned group, a group having a skeleton of at least one derivative selected from the group consisting of cinnamic acid derivatives, coumarin derivatives, chalcone derivatives, and maleimide derivatives, or a group having a skeleton of at least one compound selected from the group consisting of azobenzene compounds, stilbene compounds, and spiropyran compounds is preferable, and a group having a skeleton of a cinnamic acid derivative or a coumarin derivative is more preferable.

In Formula (1), A represents an acid-cleavage group represented by Formula (B1) or (B2), which is decomposed by an action of acid to produce a polar group. In Formulae (B1) and (B2), * represents a bonding position.

Here, the acid-cleavage group represented by Formula (B1) or (B2) is a group which is cleaved by the action of acid, resulting in elimination of the group containing a fluorine atom or a silicon atom (that is, Yin Formulae (B1) and (B2)) to produce a polar group.

In Formulae (B1) and (B2), $L^{b1}$ and $L^{b2}$ each independently represent a single bond or a divalent linking group.

Here, examples of the divalent linking group represented as one aspect of $L^{b1}$ and $L^{b2}$ include the same group as those exemplified for the divalent linking group represented as one aspect of $L^1$ in Formula (1) described above. Among those, —O-divalent hydrocarbon group is preferable, and —O-linear alkylene group having 1 to 10 carbon atoms is more preferable.

In the present invention, from the reason that coating properties of a composition for forming the upper layer (optically anisotropic layer) (hereinafter, also abbreviated as "upper layer coating properties") are improved, $L^{b1}$ and $L^{b2}$ are preferably divalent linking groups.

In Formulae (B1) and (B2), Y represents a group containing a fluorine atom or a silicon atom. However, two Y's in Formula (B1) may be the same or different from each other.

The total number of fluorine atoms and silicon atoms contained in the group containing a fluorine atom or a silicon atom is not particularly limited, but from the reason that the liquid crystal alignment properties are further improved, the total number thereof is preferably 1 to 40, more preferably 1 to 30, still more preferably 5 to 25, and particularly preferably 10 to 20.

The group containing a fluorine atom or a silicon atom is preferably a so-called organic group (group containing a carbon atom). The number of carbon atoms contained in the group containing a fluorine atom or a silicon atom is not particularly limited, but from the reason that the liquid crystal alignment properties are further improved, the number thereof is preferably 1 to 30, more preferably 3 to 20, and still more preferably 5 to 10.

Examples of the group containing a fluorine atom or a silicon atom include an alkyl group containing a fluorine atom and a group containing a polydialkylsiloxane chain.

From the reason that the liquid crystal alignment properties are further improved, the alkyl group containing a fluorine atom is preferably a group represented by Formula (F). In Formula (F), * represents a bonding position.

$$*-L^{b3}-Cf \quad \text{Formula (F)}$$

Here, $L^{b3}$ represents a single bond or a divalent linking group. Examples of the divalent linking group represented as one aspect of $L^3$ include the same group as those exemplified for the divalent linking group represented as one aspect of $L^1$ in Formula (1) described above.

In addition, Cf represents a fluorine atom-containing alkyl group. The fluorine atom-containing alkyl group represents an alkyl group containing a fluorine atom, and a perfluoroalkyl group is preferable.

From the reason that the liquid crystal alignment properties are further improved, the number of carbon atoms in the fluorine atom-containing alkyl group is not particularly limited, but is preferably 1 to 30, more preferably 3 to 20, and still more preferably 5 to 10.

From the reason that the liquid crystal alignment properties are further improved, the number of fluorine atoms contained in the fluorine atom-containing alkyl group is not particularly limited, but is preferably 1 to 40, more preferably 1 to 30, still more preferably 5 to 25, and particularly preferably 10 to 20.

In Formulae (B1) and (B2), $R^{b1}$ and $R^{b2}$ each independently represent a hydrogen atom or a substituent. However, two $R^{b2}$'s in Formula (B2) may be the same or different from each other, and may be bonded to each other to form a ring.

Here, examples of the substituent represented as one aspect of $R^{b1}$ and $R^{b2}$ include the groups exemplified in the above-described substituent represented as one aspect of $R^1$.

The substituent represented as one aspect of $R^{b1}$ is preferably an alkyl group, and more preferably a methyl group or an ethyl group.

The substituent represented as one aspect of $R^{b2}$ is preferably an alkyl group (for example, a methyl group and an ethyl group) or a ring formed by bonding two $R^{b2}$'s to each other (for example, a cyclopentane ring and a cyclohexane ring).

In the present invention, from the reason that the liquid crystal alignment properties are further improved, Ain Formula (1) is preferably the acid-cleavage group represented by Formula (B1).

From the reason that the liquid crystal alignment properties are further improved, the repeating unit represented by Formula (1) is preferably a repeating unit represented by Formula (2). Definitions of $R^1$, X, and $L^1$ in Formula (2) are the same as the definitions of $R^1$, X, and $L^1$ in Formula (1).

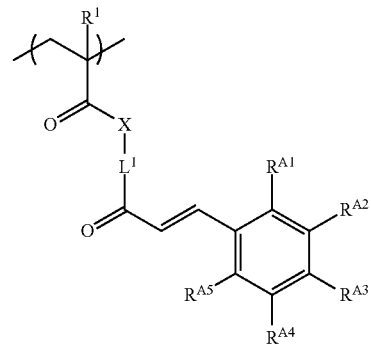

(2)

In Formula (2), $R^{A1}$, $R^{A2}$, $R^{A3}$, $R^{A4}$, and $R^{A5}$ each independently represent an acid-cleavage group represented by Formula (B1) or (B2), a hydrogen atom, or a substituent. However, at least one of $R^{A1}$, RA, $R^{A3}$, $R^{A4}$, or $R^{A5}$ represents the acid-cleavage group represented by Formula (B1) or (B2).

Here, examples of the substituent represented as one aspect of $R^{A1}$, $R^{A2}$, $R^{A3}$, $R^{A4}$, and $R^{A5}$ include the groups exemplified in the above-described substituent represented as one aspect of $R^1$. Among these, an alkoxy group is preferable, and a methoxy group is more preferable.

In the present invention, it is preferable that one to three of $R^{A1}$, $R^{A2}$, $R^{A3}$, $R^{A4}$, and $R^{A5}$ are the acid-cleavage groups represented by Formula (B1) or (B2), it is more preferable that one or two thereof are the acid-cleavage groups represented by Formula (B1) or (B2), and it is still more preferable that one thereof is the acid-cleavage group represented by Formula (B1) or (B2).

Specific examples of the repeating unit represented by Formula (1) or (2) described above are as follows.

A-1

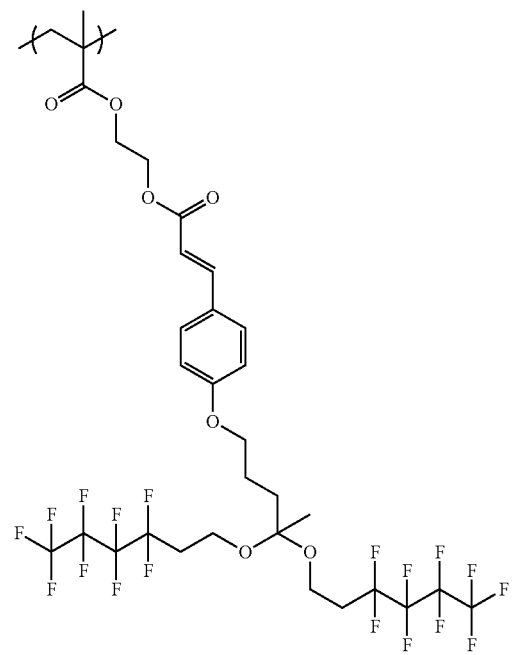

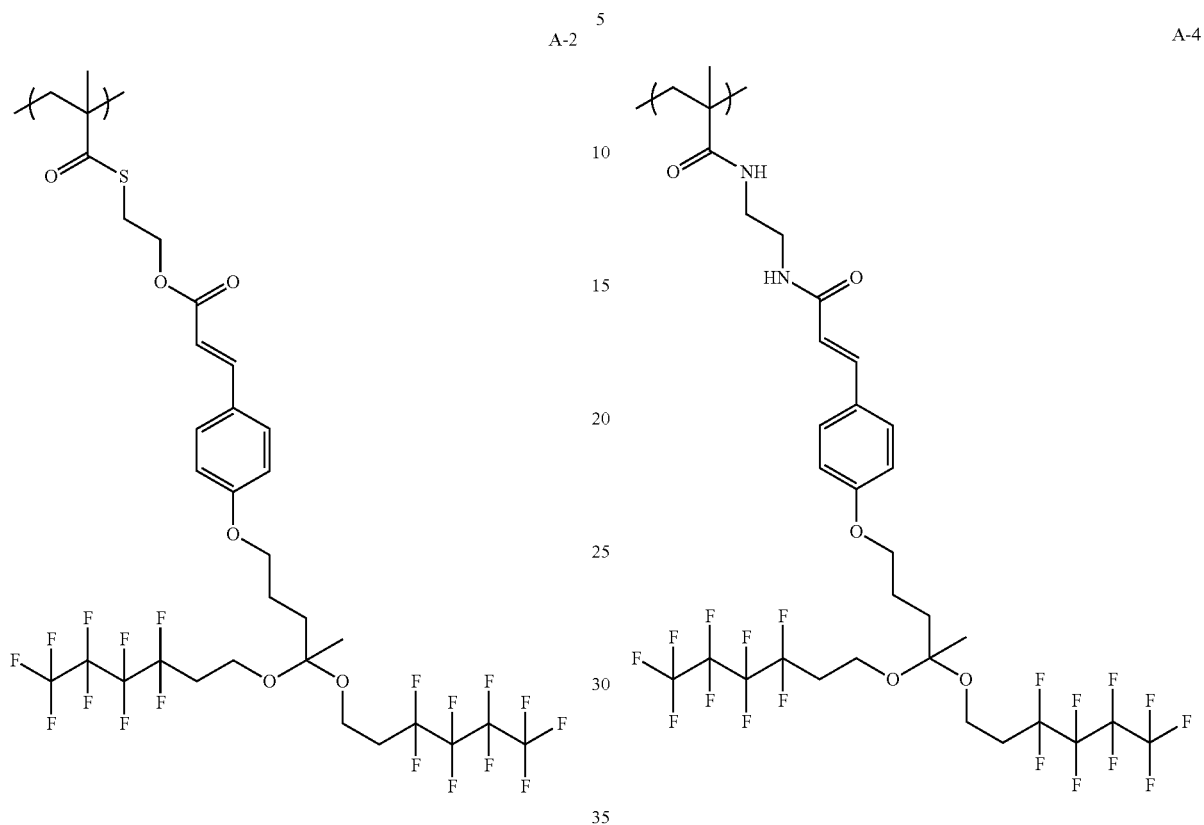
A-2
A-4
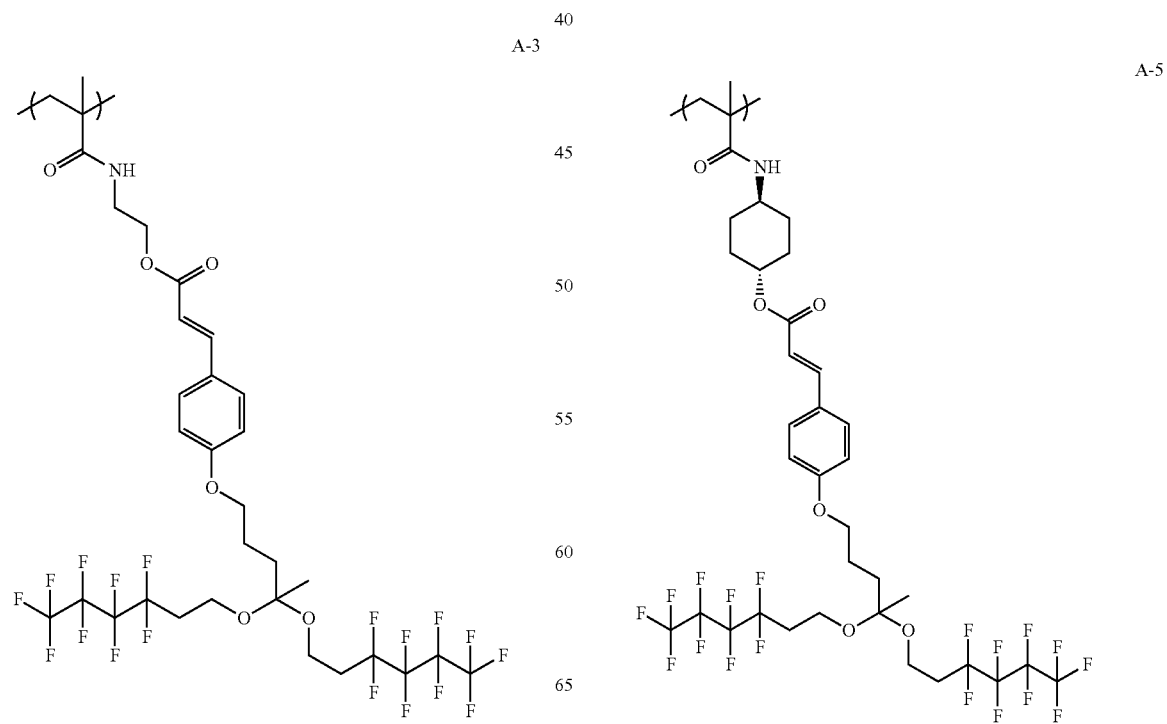
A-3
A-5

A-6
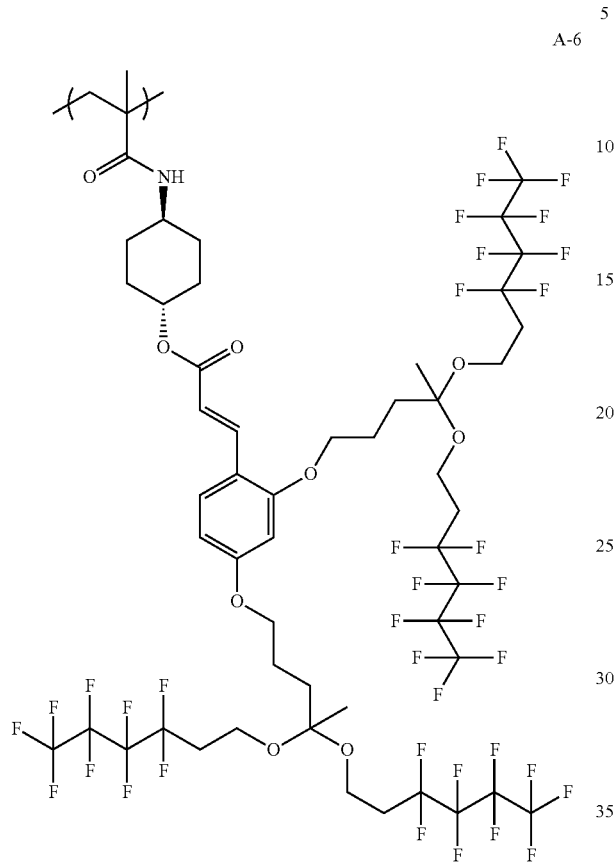
A-8
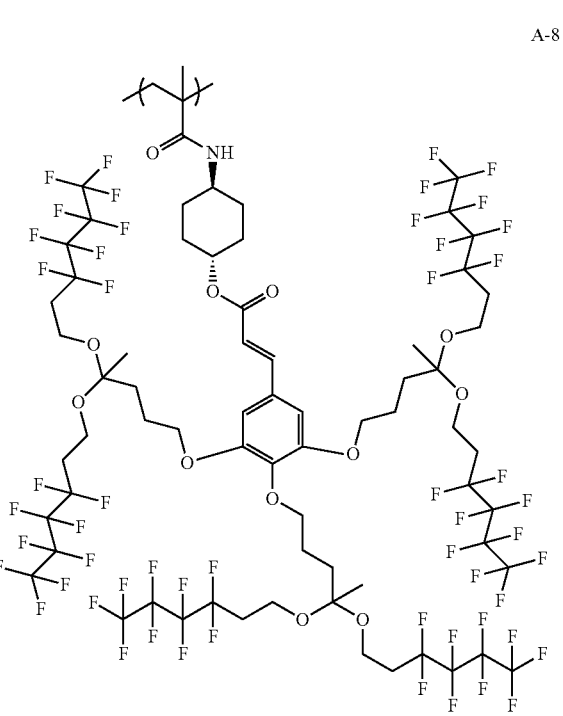
A-7
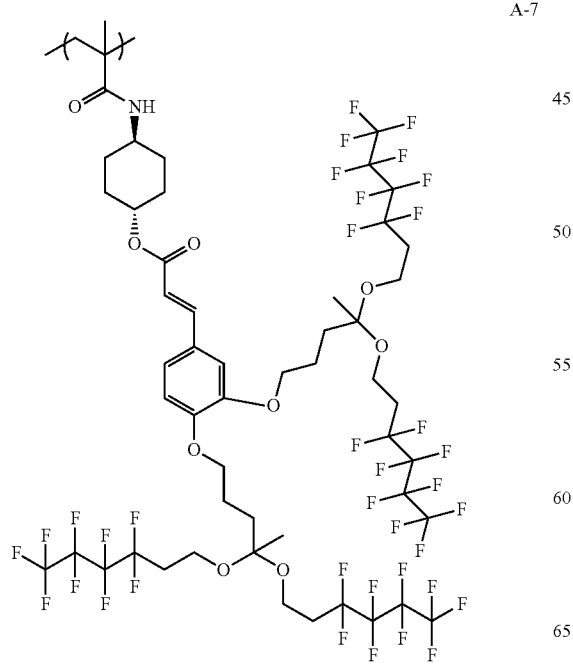
A-9
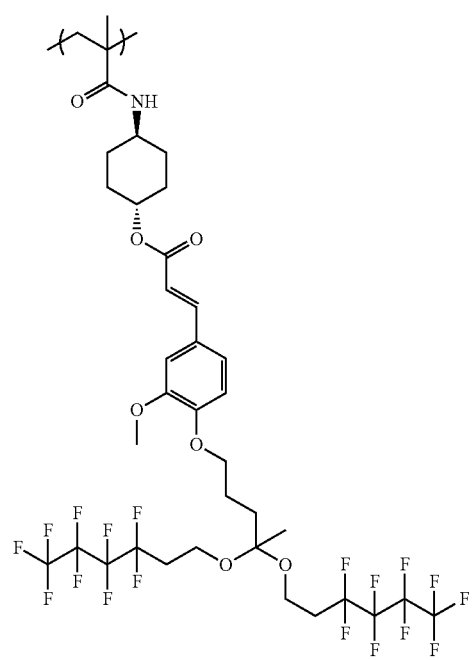

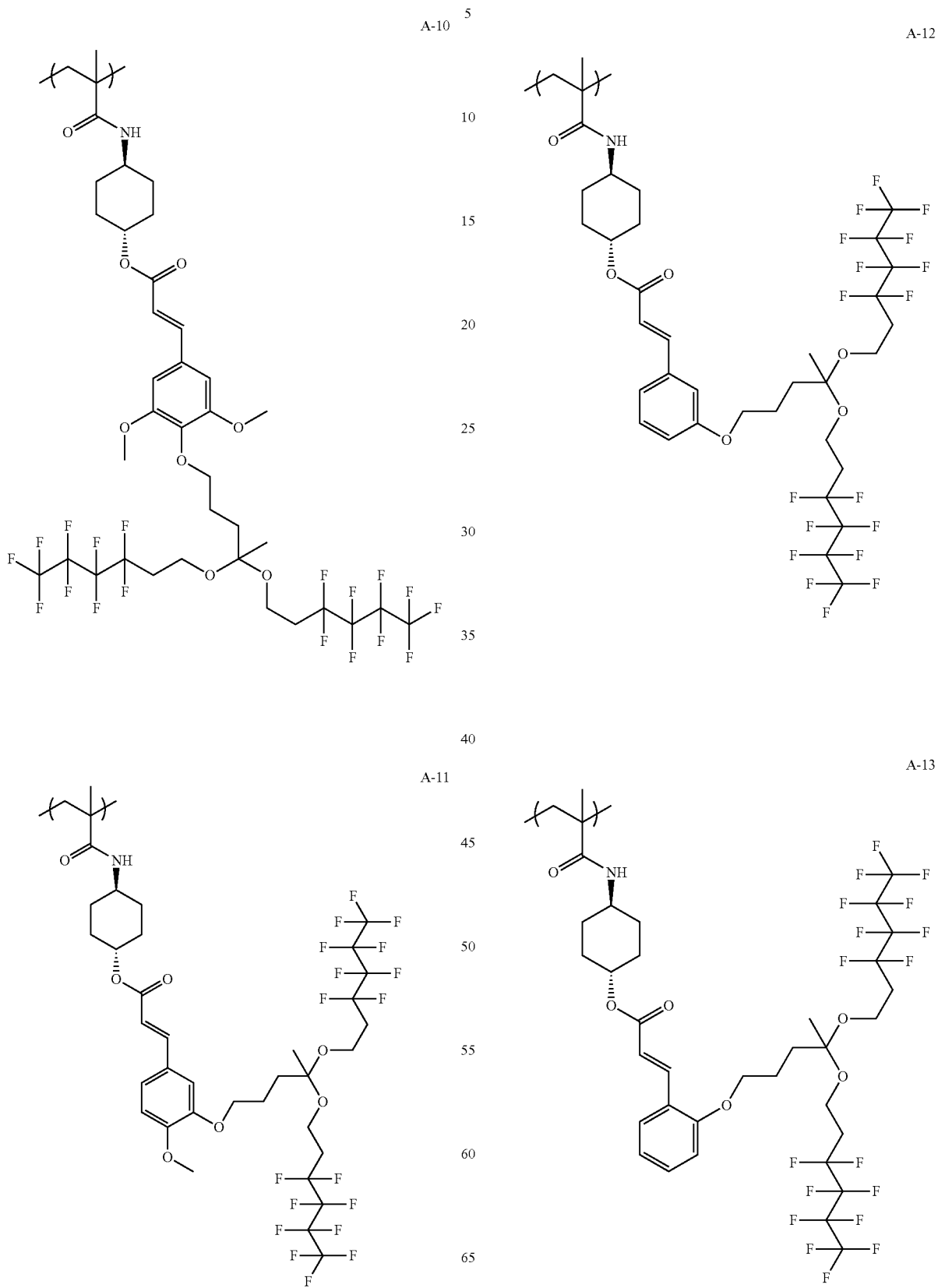

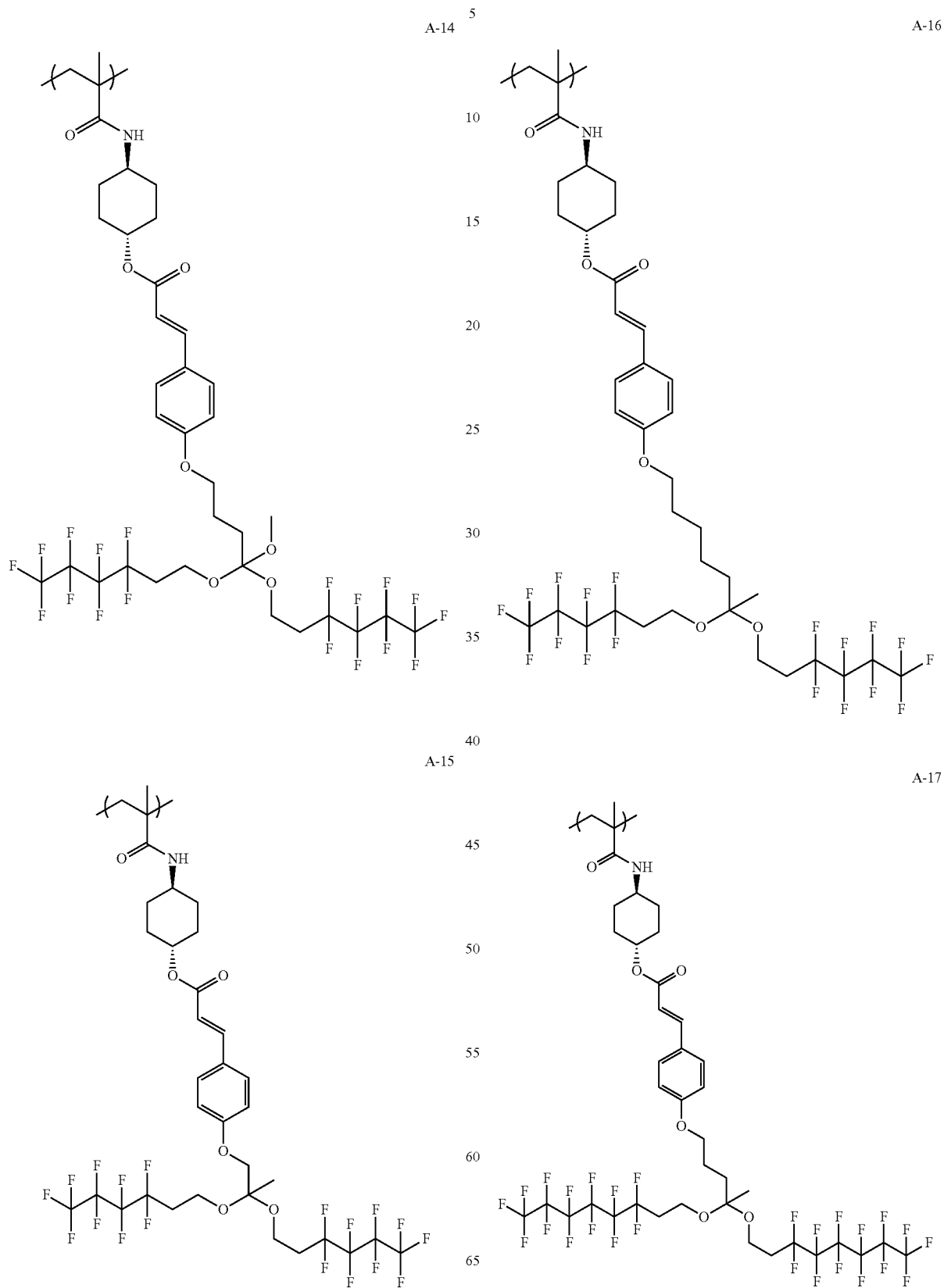

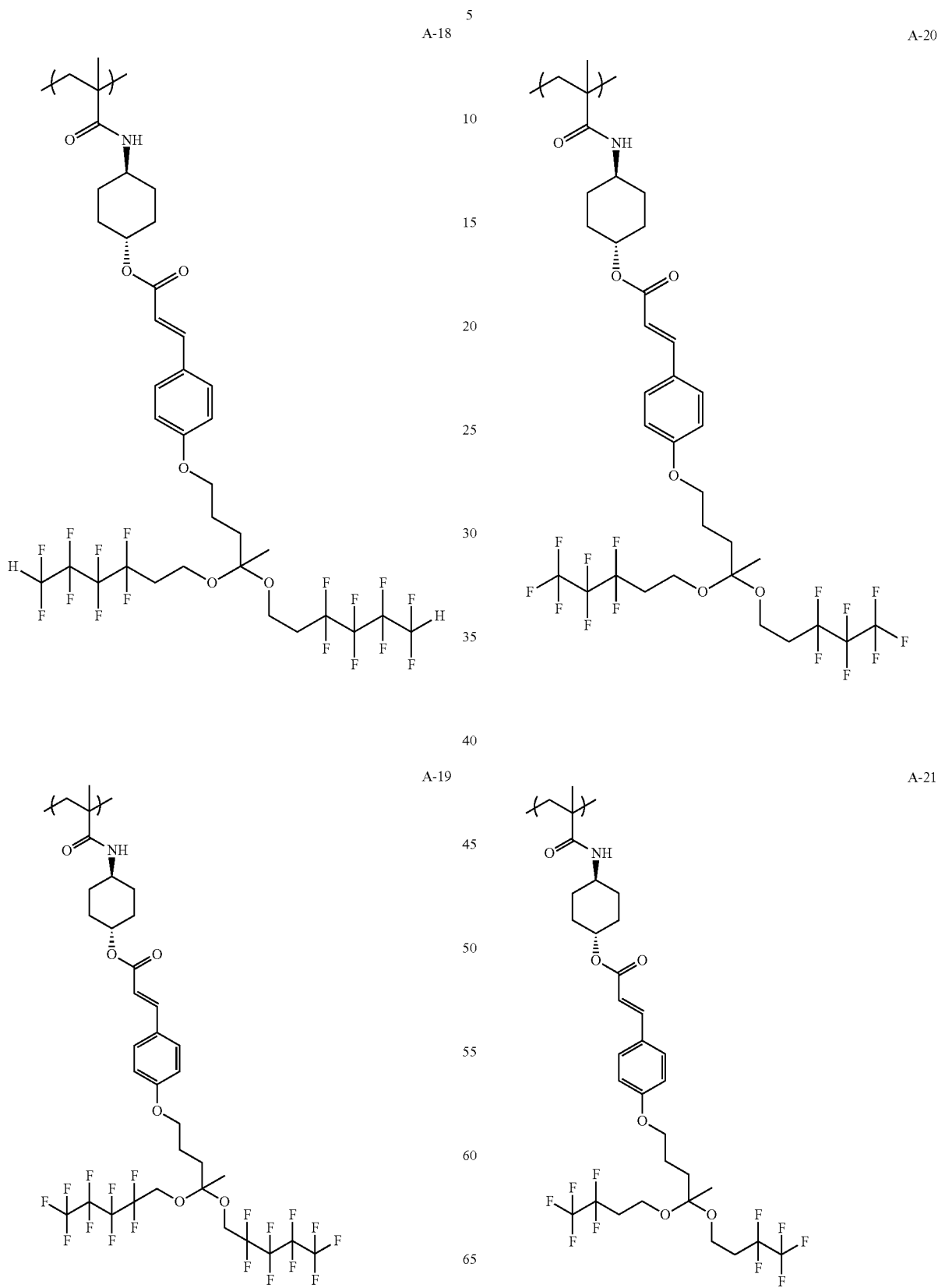

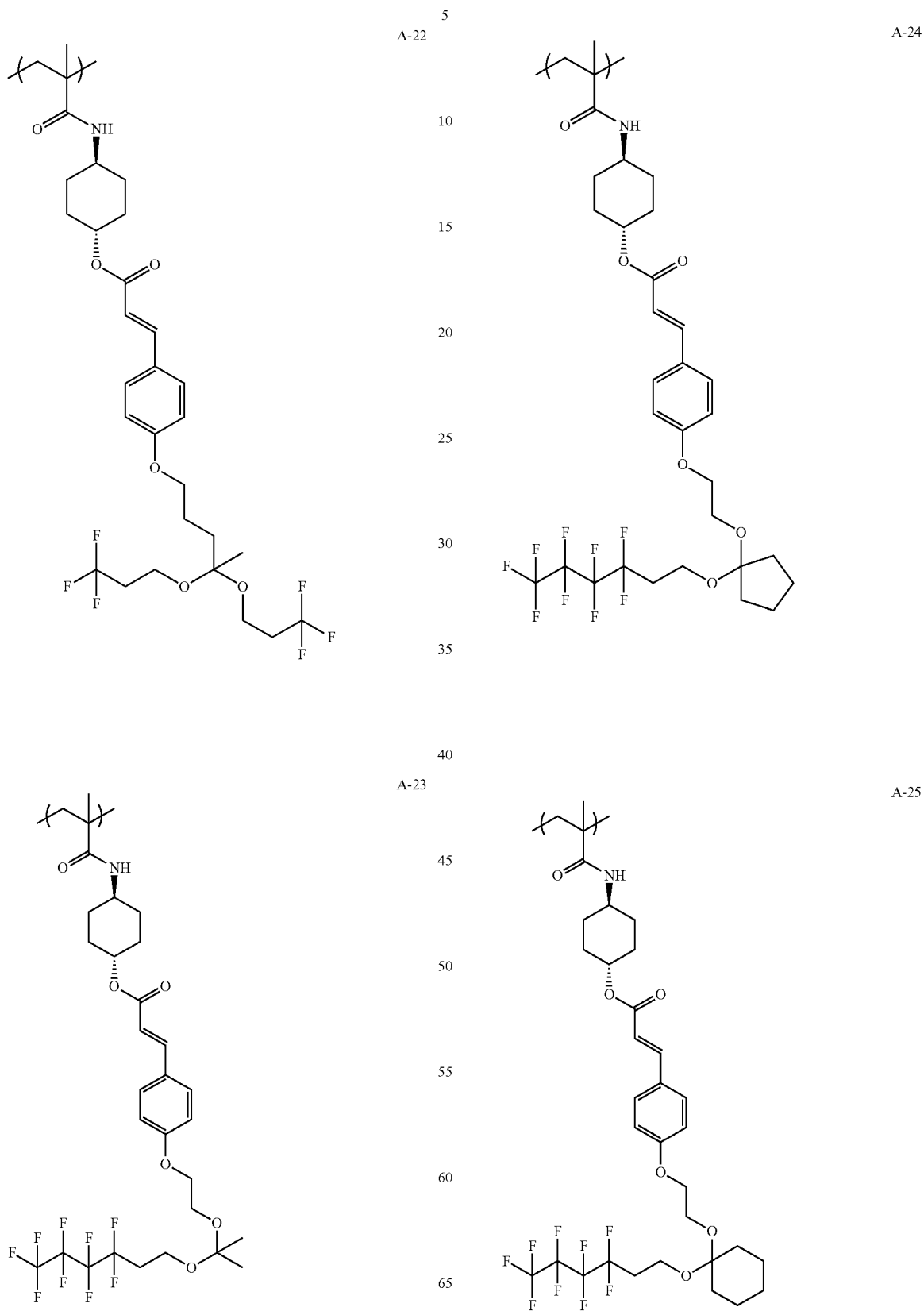

A-26

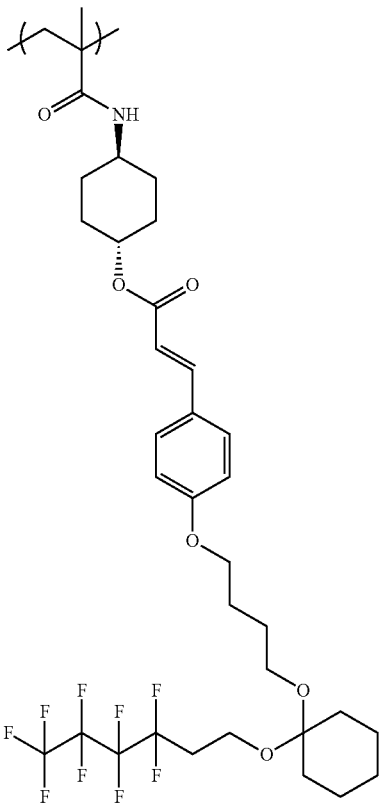

A-27

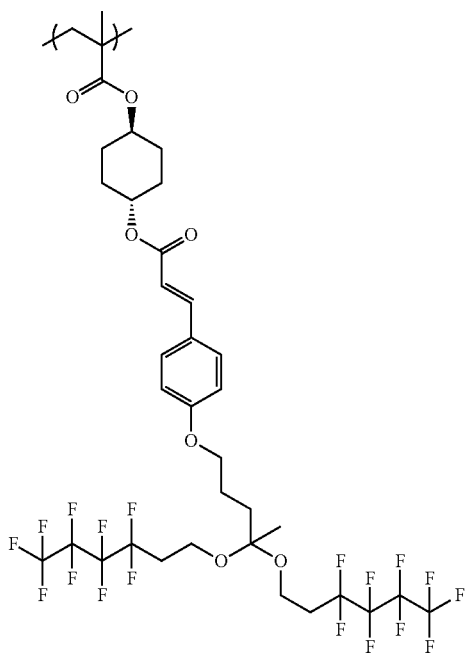

A content of the repeating unit represented by Formula (1) in the photo-alignment polymer according to the embodiment of the present invention is not particularly limited, but from the reason that the liquid crystal alignment properties are further improved, the content thereof is preferably 10 mass % or more, more preferably 20 mass % or more, and still more preferably 30 mass % or more with respect to all repeating units of the photo-alignment polymer. The upper limit may be 100 mass %.

In addition, the photo-alignment polymer according to the embodiment of the present invention may have a repeating unit other than the repeating unit represented by Formula (1). In a case of having other repeating units, the content of the repeating unit represented by Formula (1) is preferably 90 mass % or less, more preferably 80 mass % or less, and still more preferably 70 mass % or less.

The photo-alignment polymer according to the embodiment of the present invention may have a repeating unit other than the repeating unit represented by Formula (1).

Repeating Unit Having Crosslinkable Group

The photo-alignment polymer may further have a repeating unit having a crosslinkable group.

The type of the crosslinkable group is not particularly limited, and examples thereof include known crosslinkable groups. Among these, from the viewpoint of excellent adhesiveness to the upper layer disposed on a binder layer, a cationically polymerizable group or a radically polymerizable group is preferable.

Examples of the cationically polymerizable group include an epoxy group, an epoxycyclohexyl group, and an oxetanyl group.

Examples of the radically polymerizable group include an acryloyl group, a methacryloyl group, a vinyl group, a styryl group, and an allyl group.

A structure of a main chain of the repeating unit having a crosslinkable group is not particularly limited, and examples thereof include known structures. For example, a skeleton selected from the group consisting of a (meth)acrylic skeleton, a styrene-based skeleton, a siloxane-based skeleton, a cycloolefin-based skeleton, a methylpentene-based skeleton, an amide-based skeleton, and an aromatic ester-based skeleton is preferable.

Among these, a skeleton selected from the group consisting of a (meth)acrylic skeleton, a siloxane-based skeleton, and a cycloolefin-based skeleton is more preferable, and a (meth)acrylic skeleton is still more preferable.

From the reason that the liquid crystal alignment properties are further improved, the repeating unit having a crosslinkable group is preferably a repeating unit represented by Formula (C).

(C)

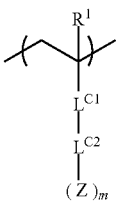

In Formula (C), $R^{C1}$ represents a hydrogen atom or a substituent.

Here, examples of the substituent represented as one aspect of $R^{C1}$ include the groups exemplified in the above-described substituent represented as one aspect of $R^1$.

$R^{C1}$ is preferably a hydrogen atom or an alkyl group, and more preferably a hydrogen atom or a methyl group.

In Formula (C), $L^{C1}$ represents a single bond or a divalent linking group.

Here, examples of the divalent linking group represented as one aspect of $L^{C1}$ include the same group as those exemplified for the divalent linking group represented as one aspect of $L^1$ in Formula (1) described above.

From the reason that the liquid crystal alignment properties are further improved, $L^{C1}$ is preferably a divalent linking group obtained by combining at least two selected from the group consisting of a linear alkylene group having 1 to 10 carbon atoms, which may have a substituent, a branched alkylene group having 3 to 10 carbon atoms, which may have a substituent, a cyclic alkylene group having 3 to 10 carbon atoms, which may have a substituent, an arylene group having 6 to 12 carbon atoms, which may have a substituent, —O—, —CO—, and —N(Q)—; and more preferably a divalent linking group obtained by combining at least two selected from the group consisting of a linear alkylene group having 1 to 10 carbon atoms, which may have a substituent, a branched alkylene group having 3 to 10 carbon atoms, which may have a substituent, a cyclic alkylene group having 3 to 10 carbon atoms, which may have a substituent, —O—, —CO—, and —NH—. Q represents a hydrogen atom or a substituent.

Examples of the substituent which may be included in the alkylene group or the arylene group described above and the substituent represented as one aspect of Q include the groups exemplified in the above-described substituent represented as one aspect of $R^1$.

In Formula (C), $L^{C2}$ represents an (m+1)-valent linking group.

Here, from the reason that the liquid crystal alignment properties are further improved, the (m+1)-valent linking group is an (m+1)-valent hydrocarbon group having 1 to 24 carbon atoms, which may have a substituent, and is preferably a hydrocarbon group in which a part of carbon atoms constituting the hydrocarbon group may be substituted with a heteroatom, and more preferably an aliphatic hydrocarbon group which may contain an oxygen atom or a nitrogen atom and has 1 to 10 carbon atoms.

The number of carbon atoms contained in the (m+1)-valent linking group is not particularly limited, but from the reason that the liquid crystal alignment properties are further improved, the number thereof is preferably 1 to 24 and more preferably 1 to 10.

The (m+1)-valent linking group is preferably a divalent linking group. Examples of the divalent linking group as a suitable aspect include the same group as those exemplified for the divalent linking group represented as one aspect of $L^1$ in Formula (1) described above.

In Formula (C), Z represents a crosslinkable group.

Here, examples of the crosslinkable group include the cationically polymerizable group or the radically polymerizable group described above.

In the present invention, from the reason that the liquid crystal alignment properties are further improved, the above-described crosslinkable group preferably represents a group represented by any one of Formula (C1), . . . , or Formula (C4).

(C1)

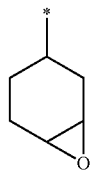
(C2)

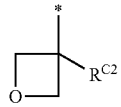
(C3)

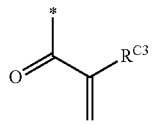
(C4)

In Formulae (C1) to (C4), * represents a bonding position.

In addition, in Formula (C3), $R^{C2}$ represents a hydrogen atom, a methyl group, or an ethyl group.

In addition, in Formula (C4), $R^{C3}$ represents a hydrogen atom or a methyl group.

In Formula (C), m represents an integer of 1 or more. In the above range, from the reason that the liquid crystal alignment properties are further improved, an integer of 1 to 5 is preferable, an integer of 1 to 3 is more preferable, and 1 or 2 is still more preferable.

Specific examples of the repeating unit having a crosslinkable group are as follows.

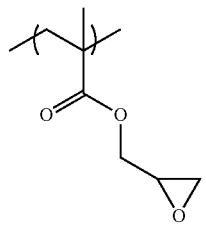
C-1

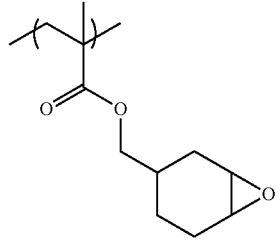
C-2

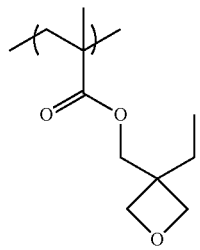
C-3

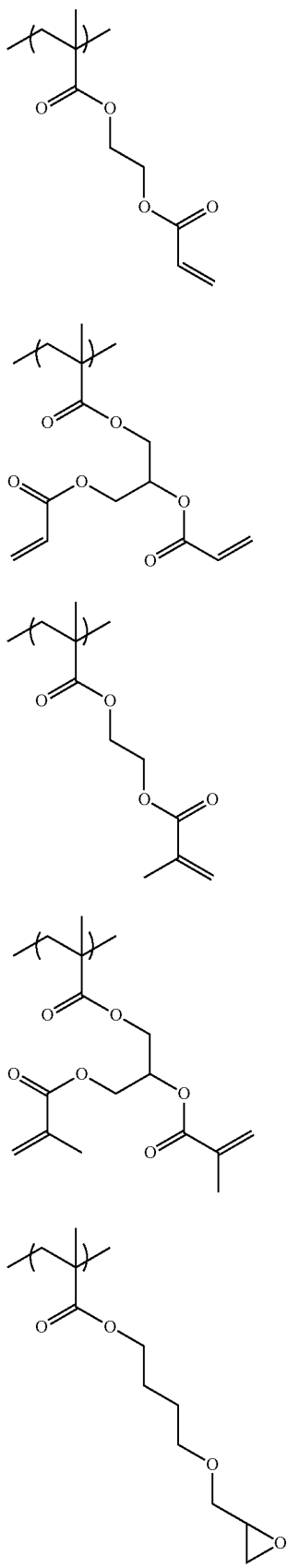
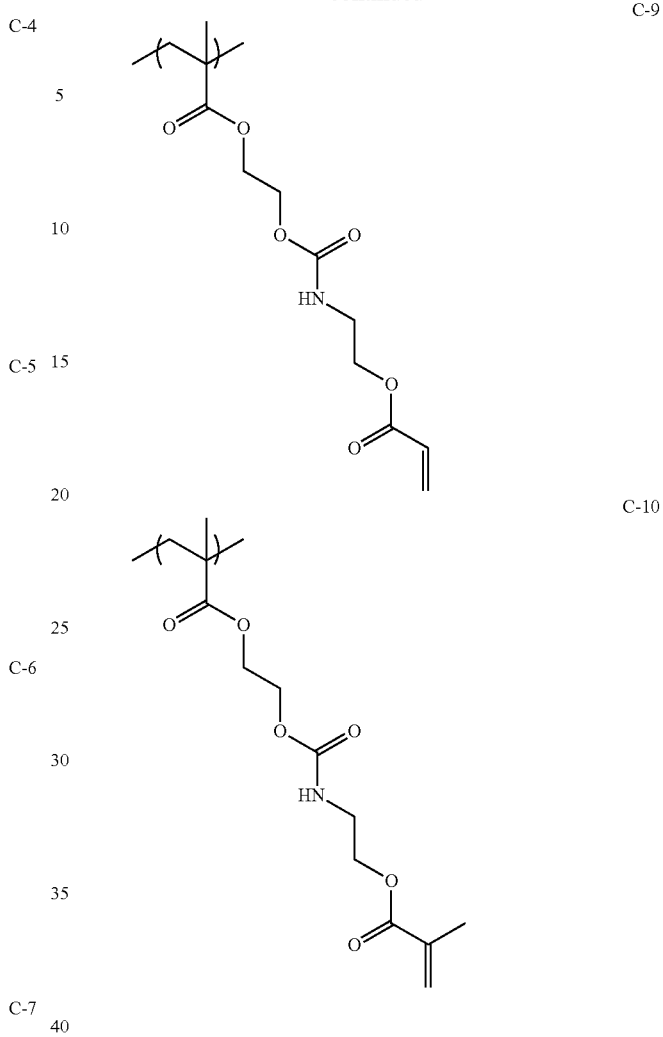

A content of the repeating unit having a crosslinkable group in the photo-alignment polymer according to the embodiment of the present invention is not particularly limited, but from the reason that the liquid crystal alignment properties are further improved, the content thereof is preferably 10 mass % or more, and more preferably 20 mass % or more with respect to all repeating units of the photo-alignment polymer. The upper limit value is not particularly limited, but is preferably 60 mass % or less and more preferably 50 mass % or less.

In the present invention, from the reason that the liquid crystal alignment properties are further improved, it is preferable that a content a of the repeating unit represented by Formula (1) described above and a content b of the repeating unit having a crosslinkable group described above satisfy Expression (D1) in terms of mass ratio.

$$0.03 \leq a/(a+b) \leq 0.8 \tag{D1}$$

Examples of a monomer (radically polymerizable monomer) forming a repeating unit other than the above-described repeating units include an acrylic acid ester compound, a methacrylic acid ester compound, a maleimide compound, an acrylamide compound, acrylonitrile, maleic acid anhydride, a styrene compound, and a vinyl compound.

A method of synthesizing the photo-alignment polymer according to the embodiment of the present invention is not particularly limited. For example, the photo-alignment polymer can be synthesized by mixing a monomer forming the repeating unit represented by Formula (1) described above and a monomer forming other repeating units such as the repeating unit having a crosslinkable group, and polymerizing the monomers using a radical polymerization initiator in an organic solvent.

A weight-average molecular weight of the photo-alignment polymer according to the embodiment of the present invention is not particularly limited, but from the reason that the liquid crystal alignment properties are further improved, the weight-average molecular weight thereof is preferably 10000 to 500000, more preferably 10000 to 300000, and still more preferably 30000 to 150000.

Here, in the present invention, the weight-average molecular weight and the number-average molecular weight are values measured by gel permeation chromatography (GPC) under the following conditions.

Solvent (eluant): Tetrahydrofuran (THF)
Device Name: TOSOH HLC-8320GPC
Column: Three items of TOSOH TSKgel Super HZM-H (4.6 mm×15 cm) are connected and used.
Column Temperature: 40° C.
Sample Concentration: 0.1 mass %
Flow Rate: 1.0 ml/min
Calibration Curve: A calibration curve made by 7 samples of TSK standard polystyrene manufactured by TOSOH Corporation, Mw of which is 2800000 to 1050 (Mw/Mn=1.03 to 1.06), is used.

Binder Composition

A binder composition according to an embodiment of the present invention is a composition including the photo-alignment polymer according to the embodiment of the present invention, a binder, and a photo-acid generator.

Here, a content of the photo-alignment polymer included in the binder composition according to the embodiment of the present invention is preferably 0.1 to 10 parts by mass, and more preferably 0.5 to 5 parts by mass with respect to 100 parts by mass of the binder described later.

In addition, a content of the photo-acid generator included in the binder composition according to the embodiment of the present invention is preferably 0.5 to 50 parts by mass, and more preferably 2.5 to 25 parts by mass with respect to 100 parts by mass of the binder described later.

Binder

The type of the binder included in the binder composition according to the embodiment of the present invention is not particularly limited. The binder itself may be a resin (hereinafter, also referred to as a "resin binder") which is formed only of a resin having no polymerization reactivity and simply dried and solidified, or a polymerizable compound.

Resin Binder

Examples of the resin binder include an epoxy resin, a diallyl phthalate resin, a silicone resin, a phenol resin, an unsaturated polyester resin, a polyimide resin, a polyurethane resin, a melamine resin, an urea resin, an ionomer resin, an ethylene ethyl acrylate resin, an acrylonitrile acrylate styrene copolymer resin, an acrylonitrile styrene resin, an acrylonitrile chloride polyethylene styrene copolymer resin, an ethylene-vinyl acetate resin, an ethylene vinyl alcohol copolymer resin, an acrylonitrile butadiene styrene copolymer resin, a vinyl chloride resin, a chlorinated polyethylene resin, a polyvinylidene chloride resin, a cellulose acetate resin, a fluororesin, a polyoxymethylene resin, a polyamide resin, a polyarylate resin, a thermoplastic polyurethane elastomer, a polyether ether ketone resin, a polyether sulfone resin, polyethylene, polypropylene, a polycarbonate resin, polystyrene, a polystyrene maleic acid copolymer resin, a polystyrene acrylic acid copolymer resin, a polyphenylene ether resin, a polyphenylene sulfide resin, a polybutadiene resin, a polybutylene terephthalate resin, an acrylic resin, a methacrylic resin, a methylpentene resin, a polylactic acid, a polybutylene succinate resin, a butyral resin, a formal resin, polyvinyl alcohol, polyvinylpyrrolidone, ethyl cellulose, carboxymethyl cellulose, gelatin, and a copolymer resin thereof.

Polymerizable Compound

Examples of the polymerizable compound include an epoxy-based monomer, a (meth)acrylic monomer, and an oxetanyl-based monomer, and an epoxy-based monomer or a (meth)acrylic monomer is preferable.

In addition, a polymerizable liquid crystal compound may be used as the polymerizable compound.

Examples of an epoxy group-containing monomer which is the epoxy-based monomer include a bisphenol A epoxy resin, a bisphenol F epoxy resin, a brominated bisphenol A epoxy resin, a bisphenol S epoxy resin, a diphenyl ether epoxy resin, a hydroquinone epoxy resin, a naphthalene epoxy resin, a biphenyl epoxy resin, a fluorene epoxy resin, a phenol novolac epoxy resin, an orthocresol novolac epoxy resin, a trishydroxyphenylmethane epoxy resin, a trifunctional epoxy resin, a tetraphenylolethane epoxy resin, a dicyclopentadiene phenol epoxy resin, a hydrogenated bisphenol A epoxy resin, a bisphenol A nucleus-containing polyol epoxy resin, a polypropylene glycol epoxy resin, a glycidyl ester epoxy resin, a glycidylamine epoxy resin, a glyoxal epoxy resin, an alicyclic epoxy resin, and a heterocyclic epoxy resin.

Examples of an acrylic monomer and a methacrylic monomer, which are the (meth)acrylic monomer, include trifunctional monomers such as trimethylolpropane triacrylate, trimethylolpropane propylene oxide (PO)-modified triacrylate, trimethylolpropane ethylene oxide (EO)-modified triacrylate, trimethylolpropane trimethacrylate, and pentaerythritol triacrylate. In addition, examples thereof further include tetrafunctional or higher-functional monomers such as pentaerythritol tetraacrylate, pentaerythritol tetramethacrylate, dipentaerythritol pentaacrylate, dipentaerythritol pentamethacrylate, dipentaerythritol hexaacrylate, and dipentaerythritol hexamethacrylate.

The polymerizable liquid crystal compound is not particularly limited, and examples thereof include a compound in which any one of homeotropic alignment, homogeneous alignment, hybrid alignment, or cholesteric alignment can be performed.

Here, in general, liquid crystal compounds can be classified into a rod-like type and a disk-like type according to the shape thereof. Furthermore, each type includes a low-molecular-type and a high-molecular-type. The term high molecular generally refers to a compound having a degree of polymerization of 100 or more (Polymer Physics-Phase Transition Dynamics, written by Masao Doi, p. 2, published by Iwanami Shoten, 1992). In the present invention, any liquid crystal compound can be used, and a rod-like liquid crystal compound or a discotic liquid crystal compound (disk-like liquid crystal compound) is preferable. In addition, a liquid crystal compound which is a monomer or has a relatively low molecular weight with a degree of polymerization of less than 100 is preferable.

In addition, examples of the polymerizable group of the polymerizable liquid crystal compound include an acryloyl group, a methacryloyl group, an epoxy group, and a vinyl group.

By polymerizing such a polymerizable liquid crystal compound, the alignment of the liquid crystal compound can be immobilized. After immobilizing the liquid crystal compound by polymerization, it is no longer necessary to exhibit liquid crystallinity.

As the rod-like liquid crystal compound, for example, compounds described in claim 1 of JP1999-513019A (JP-H11-513019A) or paragraphs [0026] to [0098] of JP2005-289980A are preferable, and as the discotic liquid crystal compound, for example, compounds described in paragraphs [0020] to [0067] of JP2007-108732A or paragraphs [0013] to [0108] of JP2010-244038A are preferable.

A liquid crystal compound having reverse wavelength dispersibility can be used as the above-described polymerizable liquid crystal compound.

Here, in this specification, the liquid crystal compound having "reverse wavelength dispersibility" refers to the fact that in the measurement of an in-plane retardation (Re) value at a specific wavelength (visible light range) of a retardation film produced using the liquid crystal compound, as the measurement wavelength increases, the Re value is the same or increased.

The liquid crystal compound having reverse wavelength dispersibility is not particularly limited as long as a film having reverse wavelength dispersibility can be formed as described above, and examples thereof include compounds represented by Formula (I) described in JP2008-297210A (particularly, compounds described in paragraphs [0034] to [0039]), compounds represented by Formula (1) described in JP2010-084032A (particularly, compounds described in paragraphs [0067] to [0073]), and compounds represented by Formula (1) described in JP2016-081035A (particularly, compounds described in paragraphs [0043] to [0055]).

Examples thereof further include compounds described in paragraphs [0027] to [0100]of JP2011-006360A, paragraphs [0028] to [0125] of JP2011-006361A, paragraphs [0034] to [0298] of JP2012-207765A, paragraphs [0016] to [0345] of JP2012-077055A, paragraphs [0017] to [0072] of WO12/141245A, paragraphs [0021] to [0088] of WO12/147904A, and paragraphs [0028] to [0115] of WO14/147904A.

Photo-Acid Generator

The binder composition according to the embodiment of the present invention includes a photo-acid generator.

The photo-acid generator is not particularly limited, and is preferably a compound which is sensitive to actinic rays having a wavelength of 300 nm or more, preferably 300 to 450 nm, and generates an acid. A photo-acid generator which is not directly sensitive to actinic rays having a wavelength of 300 nm or more can also be preferably used in combination with a sensitizer as long as it is a compound which is sensitive to actinic rays having a wavelength of 300 nm or more and generates an acid by being used in combination with the sensitizer.

The photo-acid generator is preferably a photo-acid generator which generates an acid with a pKa of 4 or less, more preferably a photo-acid generator which generates an acid with a pKa of 3 or less, and even more preferably a photo-acid generator which generates an acid with a pKa of 2 or less. In the present invention, the pKa basically refers to a pKa in water at 25° C. With a compound which cannot be measured in water, the pKa refers to a pKa measured by changing to a solvent suitable for the measurement. Specifically, the pKa described in a chemical handbook or the like can be referred to. The acid with a pKa of 3 or less is preferably a sulfonic acid or a phosphonic acid, and more preferably a sulfonic acid.

Examples of the photo-acid generator include an onium salt compound, trichloromethyl-s-triazines, a sulfonium salt, an iodonium salt, quaternary ammonium salts, a diazomethane compound, an imidosulfonate compound, and an oxime sulfonate compound. Among these, an onium salt compound, an imidosulfonate compound, or an oxime sulfonate compound is preferable, and an onium salt compound or an oxime sulfonate compound is particularly preferable. The photo-acid generators can be used alone or in combination of two or more types thereof.

The binder composition according to the embodiment of the present invention may include a component other than the photo-alignment polymer, the binder, and the photo-acid generator described above.

Polymerization Initiator

In a case where the polymerizable compound is used as the binder, the binder composition according to the embodiment of the present invention preferably includes a polymerization initiator.

The polymerization initiator is not particularly limited, and examples thereof include a thermal polymerization initiator and a photopolymerization initiator depending on the method of a polymerization reaction.

The polymerization initiator is preferably a photopolymerization initiator capable of initiating a polymerization reaction by ultraviolet irradiation.

Examples of the photopolymerization initiator include α-carbonyl compounds (described in U.S. Pat. Nos. 2,367,661A and 2,367,670A), acyloin ethers (described in U.S. Pat. No. 2,448,828A), α-hydrocarbon-substituted aromatic acyloin compounds (described in U.S. Pat. No. 2,722,512A), polynuclear quinone compounds (described in U.S. Pat. Nos. 3,046,127A and 2,951,758A), combinations of triarylimidazole dimer and p-aminophenyl ketone (described in U.S. Pat. No. 3,549,367A), acridine and phenazine compounds (described in JP1985-105667A (JP-S60-105667A) and U.S. Pat. No. 4,239,850A), oxadiazole compounds (described in U.S. Pat. No. 4,212,970A), and acylphosphine oxide compounds (described in JP1988-040799B (JP-S63-040799B), JP1993-029234B (JP-H5-029234B), JP1998-095788A (JP-H10-095788A), and JP1998-029997A (JP-H10-029997A)).

Solvent

From the viewpoint of workability for forming a binder layer, the binder composition according to the embodiment of the present invention preferably includes a solvent.

Examples of the solvent include ketones (for example, acetone, 2-butanone, methyl isobutyl ketone, cyclopentanone, and cyclohexanone), ethers (for example, dioxane and tetrahydrofuran), aliphatic hydrocarbons (for example, hexane), alicyclic hydrocarbons (for example, cyclohexane), aromatic hydrocarbons (for example, toluene, xylene, and trimethylbenzene), halogenated carbons (for example, dichloromethane, dichloroethane, dichlorobenzene, and chlorotoluene), esters (for example, methyl acetate, ethyl acetate, and butyl acetate), water, alcohols (for example, ethanol, isopropanol, butanol, and cyclohexanol), cellosolves (for example, methyl cellosolve and ethyl cellosolve), cellosolve acetates, sulfoxides (for example, dimethyl sulfoxide), and amides (for example, dimethylformamide and dimethylacetamide).

The solvents may be used alone or in combination of two or more kinds thereof.

Binder Layer

A binder layer according to the embodiment of the present invention is formed of the above-described binder composition according to the embodiment of the present invention, and is a layer in which a surface has an alignment controllability. More specifically, the binder layer is a layer formed by generating an acid from the photo-acid generator in a coating film of the binder composition and then performing a photo-alignment treatment.

That is, the method of forming a binder layer preferably has a step of generating an acid from the photo-acid generator in a coating film formed of the above-described binder composition, and then performing a photo-alignment treatment on the coating film to form a binder layer (Step 1).

The expression "has an alignment controllability" means having a function of aligning the liquid crystal compound disposed on the binder layer in a predetermined direction.

In a case where the binder composition includes a polymerizable compound, it is preferable that, in Step 1, a curing treatment is performed on the coating film formed of the above-described binder composition, a treatment for generating an acid from the photo-acid generator in the coating film (hereinafter, also simply referred to as an "acid generation treatment") is performed, and then a photo-alignment treatment is performed to form a binder layer.

As will be described later, the curing treatment and the acid generation treatment may be performed simultaneously.

Hereinafter, the method of performing the above-described curing treatment will be described in detail.

The method of forming a coating film of the binder composition is not particularly limited, and examples thereof include a method including performing coating on a support with the binder composition and optionally performing a drying treatment.

The support will be described in detail later.

In addition, an alignment layer may be disposed on the support.

The method of performing coating with the binder composition is not particularly limited, and examples of the coating method include a spin coating method, an air knife coating method, a curtain coating method, a roller coating method, a wire bar coating method, a gravure coating method, and a die coating method.

Next, a curing treatment and a treatment for generating an acid from the photo-acid generator in the coating film (hereinafter, also referred to as an "acid generation treatment") are performed on the coating film of the binder composition.

Examples of the curing treatment include a light irradiation treatment and a heating treatment.

The conditions of the curing treatment are not particularly limited, and ultraviolet rays are preferably used in polymerization by light irradiation. An irradiation amount is preferably 10 mJ/cm$^2$ to 50 J/cm$^2$, more preferably 20 mJ/cm$^2$ to 5 J/cm$^2$, still more preferably 30 mJ/cm$^2$ to 3 J/cm$^2$, and particularly preferably 50 to 1000 mJ/cm$^2$. In order to promote the polymerization reaction, the treatment may be performed under heating conditions.

The treatment for generating an acid from the photo-acid generator in the coating film is a treatment for generating an acid by irradiation with light to which the photo-acid generator included in the binder composition is exposed. By performing the treatment, cleavage at the cleavage group proceeds, and the group containing a fluorine atom or a silicon atom is eliminated.

The light irradiation treatment performed in the above-described treatment may be a treatment in which the photo-acid generator is exposed to light, and examples thereof include an ultraviolet irradiation method. As a light source, a lamp emitting ultraviolet rays, such as a high-pressure mercury lamp and a metal halide lamp, can be used. In addition, an irradiation amount is preferably 10 mJ/cm$^2$ to 50 J/cm$^2$, more preferably 20 mJ/cm$^2$ to 5 J/cm$^2$, still more preferably 30 mJ/cm$^2$ to 3 J/cm$^2$, and particularly preferably 50 to 1000 mJ/cm$^2$.

Regarding the curing treatment and the acid generation treatment described above, the acid generation treatment may be performed after the curing treatment, or the curing treatment and the acid generation treatment may be performed simultaneously. In particular, in a case where the photo-acid generator and the polymerization initiator in the binder composition are exposed to light having the same wavelength, from the viewpoint of productivity, it is preferable that the curing treatment and the acid generation treatment are performed simultaneously.

The method for the photo-alignment treatment to be performed on the coating film of the binder composition formed as described above (including a cured film of the binder composition subjected to the curing treatment) is not particularly limited, and examples thereof include known methods.

Examples of the photo-alignment treatment include a method of irradiating the coating film of the binder composition (including the cured film of the binder composition subjected to the curing treatment) with polarized light or irradiating the surface of the coating film with unpolarized light from an oblique direction.

In the photo-alignment treatment, the polarized light to be irradiated is not particularly limited. Examples thereof include linearly polarized light, circularly polarized light, and elliptically polarized light, and linearly polarized light is preferable.

In addition, the "oblique direction" in which irradiation with unpolarized light is performed is not particularly limited as long as it is a direction inclined at a polar angle θ (0°<θ<90°) with respect to a normal direction of the surface of the coating film. θ can be appropriately selected according to the purpose, and is preferably 20° to 80°.

A wavelength of the polarized light or the unpolarized light is not particularly limited as long as the light is light to which the photo-aligned group is exposed. Examples thereof include ultraviolet rays, near-ultraviolet rays, and visible rays, and near-ultraviolet rays of 250 to 450 nm are preferable.

In addition, examples of a light source for the irradiation with polarized light or unpolarized light include a xenon lamp, a high-pressure mercury lamp, an ultra-high pressure mercury lamp, and a metal halide lamp. By using an interference filter, a color filter, or the like with respect to ultraviolet rays or visible rays obtained from the light source, the wavelength range of the irradiation can be restricted. In addition, linearly polarized light can be obtained by using a polarization filter or a polarization prism with respect to the light from the light source.

An integrated quantity of the polarized light or the unpolarized light is not particularly limited, and is preferably 1 to 300 mJ/cm$^2$ and more preferably 5 to 100 mJ/cm$^2$.

An illuminance of the polarized light or the unpolarized light is not particularly limited, and is preferably 0.1 to 300 mW/cm$^2$ and more preferably 1 to 100 mW/cm$^2$.

The aspect in which the curing treatment and the acid generation treatment are performed before the photo-alignment treatment has been described, but the present invention is not limited to this aspect. The curing treatment and the acid generation treatment may be performed simultaneously in the photo-alignment treatment.

A thickness of the binder layer is not particularly limited, but from the reason that the liquid crystal alignment properties are further improved, the thickness thereof is preferably 0.1 to 10 m and more preferably 0.5 to 5 m.

Optical Laminate

An optical laminate according to the embodiment of the present invention has the binder layer according to the embodiment of the present invention and an optically anisotropic layer provided on the binder layer.

A suitable aspect of the optical laminate according to the embodiment of the present invention is that the optically anisotropic layer provided on the binder layer is formed of a polymerizable liquid crystal composition including a polymerizable liquid crystal compound, and the binder layer and the optically anisotropic layer are laminated adjacent to each other.

In addition, the optical laminate according to the embodiment of the present invention preferably has a support which supports the binder layer.

Hereinafter, suitable aspects of the optical laminate according to the embodiment of the present invention will be described in detail.

Support

Examples of the support include a glass substrate and a polymer film.

Examples of a material of the polymer film include cellulose-based polymers; acrylic polymers having an acrylic acid ester polymer such as polymethyl methacrylate and a lactone ring-containing polymer; thermoplastic norbornene-based polymers; polycarbonate-based polymers; polyester-based polymers such as polyethylene terephthalate and polyethylene naphthalate; styrene-based polymers such as polystyrene and an acrylonitrile-styrene copolymer; polyolefin-based polymers such as polyethylene, polypropylene, and an ethylene-propylene copolymer; vinyl chloride-based polymers; amide-based polymers such as nylon and aromatic polyamide; imide-based polymers; sulfone-based polymers; polyether sulfone-based polymers; polyether ether ketone-based polymers; polyphenylene sulfide-based polymers; vinylidene chloride-based polymers; vinyl alcohol-based polymers; vinyl butyral-based polymers; arylate-based polymers; polyoxymethylene-based polymers; epoxy-based polymers; and polymers obtained by mixing these polymers.

A thickness of the support is not particularly limited, but is preferably 5 to 200 μm, more preferably 10 to 100 μm, and still more preferably 20 to 90 μm. It is preferable the support is peelable.

Binder Layer

The binder layer is the above-described binder layer according to the embodiment of the present invention.

Optically Anisotropic Layer

The optically anisotropic layer is preferably formed of a polymerizable liquid crystal composition including a polymerizable liquid crystal compound.

Here, examples of the polymerizable liquid crystal composition for forming the optically anisotropic layer include a composition obtained by blending the polymerizable liquid crystal compound, the polymerization initiator, the solvent, and the like described as optional components in the binder composition according to the embodiment of the present invention.

A thickness of the optically anisotropic layer is not particularly limited, and is preferably 0.1 to 10 μm and more preferably 0.5 to 5 μm.

Optical Laminate Manufacturing Method

An optical laminate manufacturing method according to the embodiment of the present invention is a method of producing a suitable aspect of the above-described optical laminate according to the embodiment of the present invention, and includes a step of generating an acid from the photo-acid generator in a coating film formed of the above-described binder composition, and then performing a photo-alignment treatment on the coating film to form a binder layer (Step 1), and a step of performing coating on the binder layer with a polymerizable liquid crystal composition including a polymerizable liquid crystal compound to form an optically anisotropic layer (Step 2).

Step 1

Step 1 is a step of generating an acid from the photo-acid generator in a coating film formed of the binder composition, and then performing a photo-alignment treatment on the coating film to form a binder layer.

The procedure of Step 1 is as described above.

Step 2

Step 2 is a step of performing coating on the binder layer with a polymerizable liquid crystal composition including a polymerizable liquid crystal compound to form an optically anisotropic layer.

The method of performing coating with the polymerizable liquid crystal composition is not particularly limited, and examples thereof include the coating method exemplified in Step 1.

Examples of the method of forming the optically anisotropic layer include a method in which a coating film of the polymerizable liquid crystal composition is subjected to a heating treatment and then subjected to a curing treatment. The polymerizable liquid crystal compound can be aligned by the above-described heating treatment.

In the above description, the heating treatment and the curing treatment are separately performed. However, a method in which the curing treatment is performed under heating conditions may also be carried out.

In a case where the polymerizable liquid crystal compound is aligned without performing the heating treatment depending on the type of the polymerizable liquid crystal compound, the heating treatment may not be performed.

After being heated, the coating film may be optionally cooled before the curing treatment described later.

The conditions of the heating treatment are not particularly limited, and the temperature may be adjusted so that the polymerizable liquid crystal compound is aligned. Usually, the heating temperature is preferably 30° C. to 100° C. and more preferably 50° C. to 80° C. The heating time is preferably 0.5 to 20 minutes, and more preferably 1 to 5 minutes.

The method for the curing treatment is not particularly limited. Examples thereof include a light irradiation treatment and a heating treatment, and a light irradiation treatment is preferable. Ultraviolet rays are preferable as light in the light irradiation treatment.

The conditions for a case where the light irradiation is performed are not particularly limited, and an irradiation amount is preferably 10 $mJ/cm^2$ to 50 $J/cm^2$, more preferably 20 $mJ/cm^2$ to 5 $J/cm^2$, and still more preferably 30 $mJ/cm^2$ to 3 $J/cm^2$.

In order to promote the polymerization reaction, the treatment may be performed under heating conditions.

Image Display Device

An image display device according to the embodiment of the present invention is an image display device having the optically anisotropic layer according to the present invention or the optical laminate according to the embodiment of the present invention.

The display element which is used in the image display device according to the embodiment of the present invention is not particularly limited, and examples thereof include a liquid crystal cell, an organic electroluminescence (hereinafter, abbreviated as "EL") display panel, and a plasma display panel.

Among these, a liquid crystal cell or an organic EL display panel is preferable, and a liquid crystal cell is more preferable. That is, the image display device according to the embodiment of the present invention is preferably a liquid crystal display device using a liquid crystal cell as a display element or an organic EL display device using an organic EL display panel as a display element.

Liquid Crystal Display Device

A liquid crystal display device as an example of the image display device according to the embodiment of the present invention has the optically anisotropic layer according to the present invention or the optical laminate according to the embodiment of the present invention described above, and a liquid crystal cell.

The liquid crystal cell which is used in the liquid crystal display device is preferably a vertical alignment (VA) mode, an optically compensated bend (OCB) mode, an in-plane-switching (IPS) mode, a fringe-field-switching (FFS) mode, or a twisted nematic (TN) mode, but is not limited thereto.

Organic EL Display Device

Suitable examples of the organic EL display device as an example of the image display device according to the embodiment of the present invention include a device having an aspect in which it has a polarizer, the optically anisotropic layer according to the present invention or the optical laminate according to the embodiment of the present invention, and an organic EL display panel in this order from the viewing side.

Polarizer

The above-described polarizer is not particularly limited as long as it is a member having a function of converting light into specific linearly polarized light. An absorption-type polarizer or a reflective-type polarizer which has been known can be used.

Examples of the absorption-type polarizer include an iodine-based polarizer, a dye-based polarizer using a dichroic dye, and a polyene-based polarizer. The iodine-based polarizer and the dye-based polarizer include a coating-type polarizer and a stretching-type polarizer, and any of these is applicable.

Examples of the method of obtaining a polarizer by performing stretching and dyeing in a state in which a laminate film is obtained by forming a polyvinyl alcohol layer on a base material include JP5048120B, JP5143918B, JP4691205B, JP4751481B, and JP4751486B.

Examples of the reflective-type polarizer include a polarizer obtained by laminating thin films having different birefringences, a wire grid-type polarizer, and a polarizer obtained by combining a cholesteric liquid crystal having a selective reflection range and a ¼ wavelength plate.

Among these, from the viewpoint of more excellent adhesiveness, a polarizer including a polyvinyl alcohol-based resin (a polymer including —$CH_2$—CHOH— as a repeating unit; in particular, at least one selected from the group consisting of a polyvinyl alcohol and an ethylene-vinyl alcohol copolymer) is preferable.

A thickness of the polarizer is not particularly limited, and is preferably 3 to 60 μm, more preferably 5 to 30 μm, and still more preferably 5 to 15 μm.

Organic EL Display Panel

The organic EL display panel is a member in which a light emitting layer or a plurality of organic compound thin films including a light emitting layer is formed between a pair of electrodes of an anode and a cathode. In addition to the light emitting layer, a hole injection layer, a hole transport layer, an electron injection layer, an electron transport layer, a protective layer, and the like may be provided, and each of these layers may have a different function.

Various materials can be used to form the respective layers.

EXAMPLES

Hereinafter, the present invention will be more specifically described with examples. Materials, used amounts, ratios, treatment contents, and treatment procedures shown in the following examples are able to be suitably changed unless the changes cause deviance from the gist of the invention. Therefore, the range of the present invention will not be restrictively interpreted by the following examples.

Monomer Synthesis

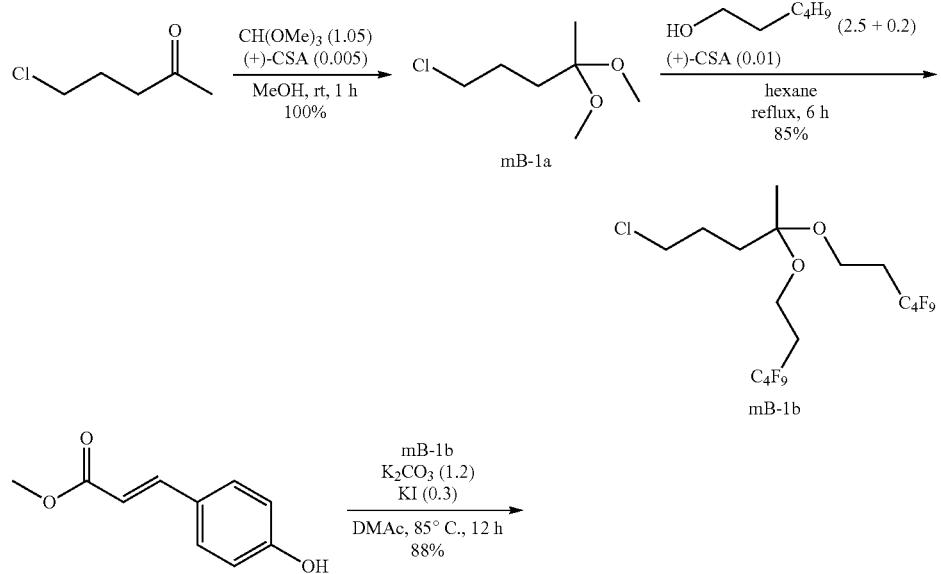

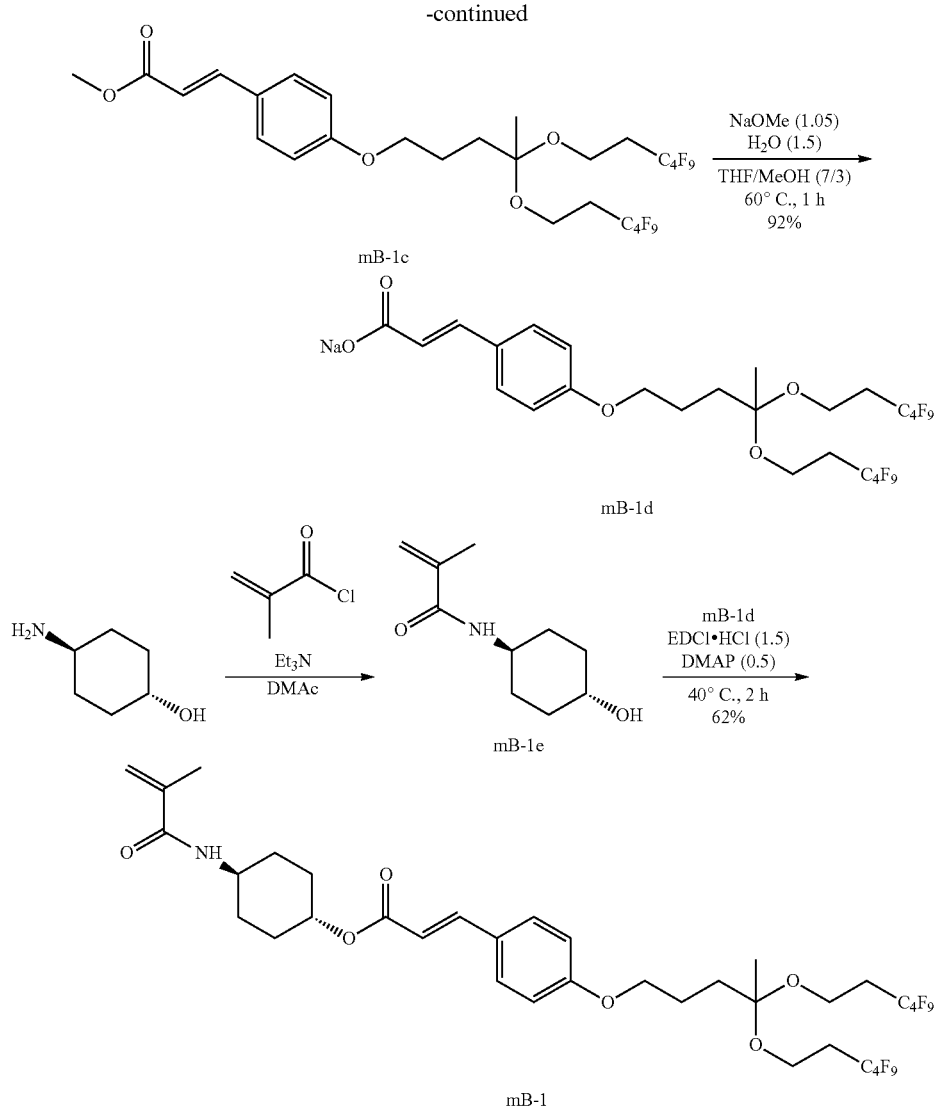

A Step 300 g of 5-chloro-2-pentanone (Manchester Organics Ltd.), 2.89 g of (+)-10-camphorsulfonic acid, and 120 mL of methanol were weighed into a 2000 mL three-neck eggplant flask, and 277 g of trimethyl orthoformate (NIPPOH CHEMICALS CO., LTD.) was added dropwise thereto over 30 minutes while stirring in a water bath. After completion of the dropwise addition, the reaction solution was stirred in a water bath for 1 hour, and 15 mL of diisopropylethylamine was added thereto to terminate the reaction. Subsequently, methyl formate was distilled off under a reduced pressure of 100 mmHg, the resultant was diluted with 1200 mL of hexane and separately washed twice with 800 mL of solvent-saturated sodium hydrogen carbonate water, and the obtained organic layer was dried over anhydrous magnesium sulfate and concentrated to obtain 441 g of mB-1a (yield: 100%) as a black liquid.

B Step 250 g of mB-1a, 911 g of 2-(perfluorobutyl)ethanol (Unimatec), 3.21 g of (+)-10-camphorsulfonic acid, and 412 mL of hexane were weighed into a 3000 mL three-neck eggplant flask, and the mixture was heated at 72° C. for 30 minutes while flowing nitrogen at 60 mL/min and stirring. Subsequently, while flowing nitrogen at 60 mL/min and keeping the internal temperature at 72° C., hexane was added dropwise thereto at a flow rate of 13.7 mL/min for 5 hours using a dropping pump, and the reaction solution was stirred for 1 hour after completion of the dropwise addition. All the solvent volatilized during the reaction was distilled off using a Dean-Stark tube. 4.6 mL of diisopropylethylamine was added thereto to terminate the reaction, the mixture was cooled to room temperature, diluted with 3300 mL of hexane, and separately washed twice with 1980 mL of acetonitrile/water/triethylamine (5/1/0.005, vol %), and the obtained organic layer was dried over anhydrous magnesium sulfate and concentrated to obtain 695 g of mB-1b (yield: 79%) as a brown liquid.

C Step 25 g of methyl p-hydroxybenzoate, 100 g of mB-1b, 23 g of potassium carbonate, 6.9 g of potassium iodide, and 50 mL of dimethylacetamide were weighed into a 300 mL three-neck eggplant flask, and the reaction solution was heated at 85° C. for 12 hours while stirring. After cooling to room temperature, the reaction solution was diluted with 260 mL of hexane and 140 mL of ethyl acetate and separately washed with 300 mL of ion exchange water, the obtained organic layer was dried over anhydrous magnesium sulfate, and the obtained solution was concentrated and recrystallized from hexane to obtain 93 g of mB-1c (yield: 88%) as a pale yellow solid.

D Step 50 g of mB-1c, 3.7 g of sodium methoxide, 1.75 g of ion exchange water, 17.5 mL of tetrahydrofuran, and 7.5 mL of methanol were weighed into a 300 mL three-neck eggplant flask, and the reaction solution was heated at 50° C. for 1 hour while stirring. After cooling to room temperature, the reaction solution was diluted with 150 mL of hexane and 10 mL of ethyl acetate, the obtained crystals were collected by filtration and vacuum-dried to obtain 46 g of mB-1d (yield: 92%) as a pale yellow solid.

Final Step 2.5 g of 4-aminocyclohexanol, 2.4 g of triethylamine, and 18 mL of dimethylacetamide were weighed into a 100 mL three-neck eggplant flask, and 2.4 g of methacryloyl chloride was added dropwise thereto over 30 minutes while stirring at 0° C. After completion of the dropwise addition, the mixture was heated at 40° C. for 1 hour to obtain mB-1e as a brown solution. 12.6 g of mB-1d, 0.94 g of dimethylaminopyridine, and 4.4 g of 1-ethyl-3-(3-dimethylaminopropyl) carbodiimide hydrochloride were added to the reaction container, the reaction solution was heated at 40° C. for 2 hours and then cooled to room temperature, 10 mL of methanol and 50 mL of water were added thereto, and the obtained crystals were collected by filtration. The crystals were dissolved in 200 mL of ethyl acetate and separately washed with saturated saline, the obtained organic layer was dried over anhydrous magnesium sulfate, and the obtained solution was concentrated and recrystallized from hexane to obtain 9.4 g of a monomer mB-1 represented by mB-1 (yield: 63%) as a pale yellow solid.

Example 1 (Synthesis of Photo-Alignment Polymer P-1)

1.0 part by mass of the following monomer mB-1, 1.0 part by mass of a monomer mC-4 represented by Formula mC-4, 0.02 parts by mass of 2,2'-azobis(isobutyronitrile) as a polymerization initiator, and 2.5 parts by mass of toluene as a solvent were put into a flask equipped with a cooling pipe, a thermometer, and a stirrer, and the reaction mixture was reacted at 70° C. for 7 hours by heating in a water bath while nitrogen was passed through the flask at 30 mL/min. After completion of the reaction, the reaction mixture was allowed to cool to room temperature. The obtained polymer solution was poured into a large excess of methanol to precipitate the polymer, and the recovered precipitate was separated by filtering and washed with a large amount of methanol. Next, the resultant was vacuum-dried at 40° C. for 2 hours to obtain a photo-alignment polymer P-1 represented by Formula P-1. The alphabet described in each repeating unit in Formula P-1 represents the content (mass %) of each repeating unit with respect to all repeating units, and a and b were 53 mass % and 47 mass %, respectively. In addition, the weight-average molecular weight thereof was 110000.

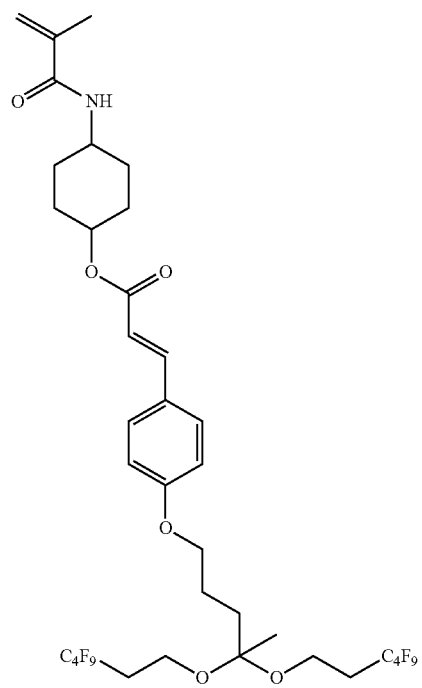

mB-1

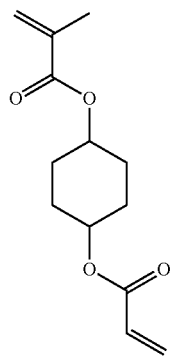

mC-4

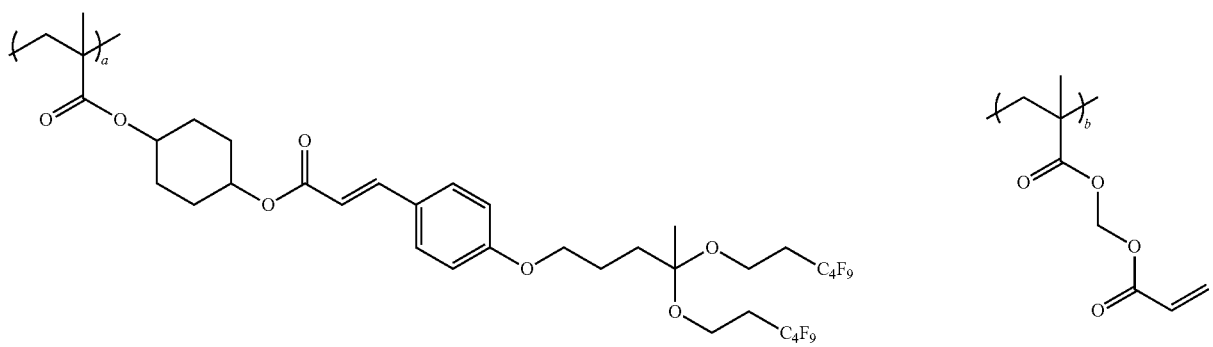

P-1

Example 1 (Production of Optical Laminate (1A))

Using a geeser coater, a composition (1A-a) for forming an optically anisotropic layer containing a disk-like liquid crystal compound having the following composition was applied to a cellulose acylate film TG40 (manufactured by FUJIFILM Corporation; thickness: 40 m) to form a composition layer. Thereafter, both ends of the film were held, a cooling plate (9° C.) was placed on a side of the film, on which a coating film was formed so that a distance from the film was 5 mm, a heater (110° C.) was placed on a side opposite to the surface of the film, on which a coating film was formed so that a distance from the film was 5 mm, and the film was dried for 90 seconds.

Next, the obtained film was heated with hot air at 116° C. for 1 minute, and while purging with nitrogen so that the atmosphere had an oxygen concentration of 100 ppm by volume or less, ultraviolet rays were irradiated at an irradiation amount of 150 mJ/cm² using a 365 nm UV-LED.

Thereafter, the obtained coating film was annealed with hot air at 115° C. for 25 seconds.

Next, the obtained coating film was irradiated with 7.9 mJ/cm² of UV light (ultra-high pressure mercury lamp; UL750; manufactured by HOYA CANDEO OPTRONICS CORPORATION) (wavelength: 313 nm) passing through a wire grid polarizer at room temperature to form an optically anisotropic layer (1A-a) having an alignment controllability on its surface, which corresponded to a lower layer (binder layer).

A film thickness of the formed optically anisotropic layer (1A-a) was 1.0 μm. An in-plane retardation Re at a wavelength of 550 nm was 0 nm, and a retardation Rth in a thickness direction at a wavelength of 550 nm was 40 nm. An average tilt angle of a disc plane of the disk-like liquid crystal compound with respect to the surface of the film was 0°, and it was confirmed that the disk-like liquid crystal compound was aligned horizontally with respect to the surface of the film.

| Composition (1A-a) For Forming Optically Anisotropic Layer | |
|---|---|
| Disk-like liquid crystal compound 1 shown below | 8 parts by mass |
| Disk-like liquid crystal compound 2 shown below | 2 parts by mass |
| Disk-like liquid crystal compound 3 shown below | 90.0 parts by mass |
| Polymerizable monomer 1 shown below | 12.0 parts by mass |
| Polymerization initiator S-1 (oxime type) shown below | 3.0 parts by mass |
| Photoacid generator D-1 shown below | 3.0 parts by mass |
| Photo-alignment polymer P-1 described above | 0.6 parts by mass |

-continued

| Composition (1A-a) For Forming Optically Anisotropic Layer | |
|---|---|
| Triisopropylamine | 0.2 parts by mass |
| o-xylene | 634 parts by mass |

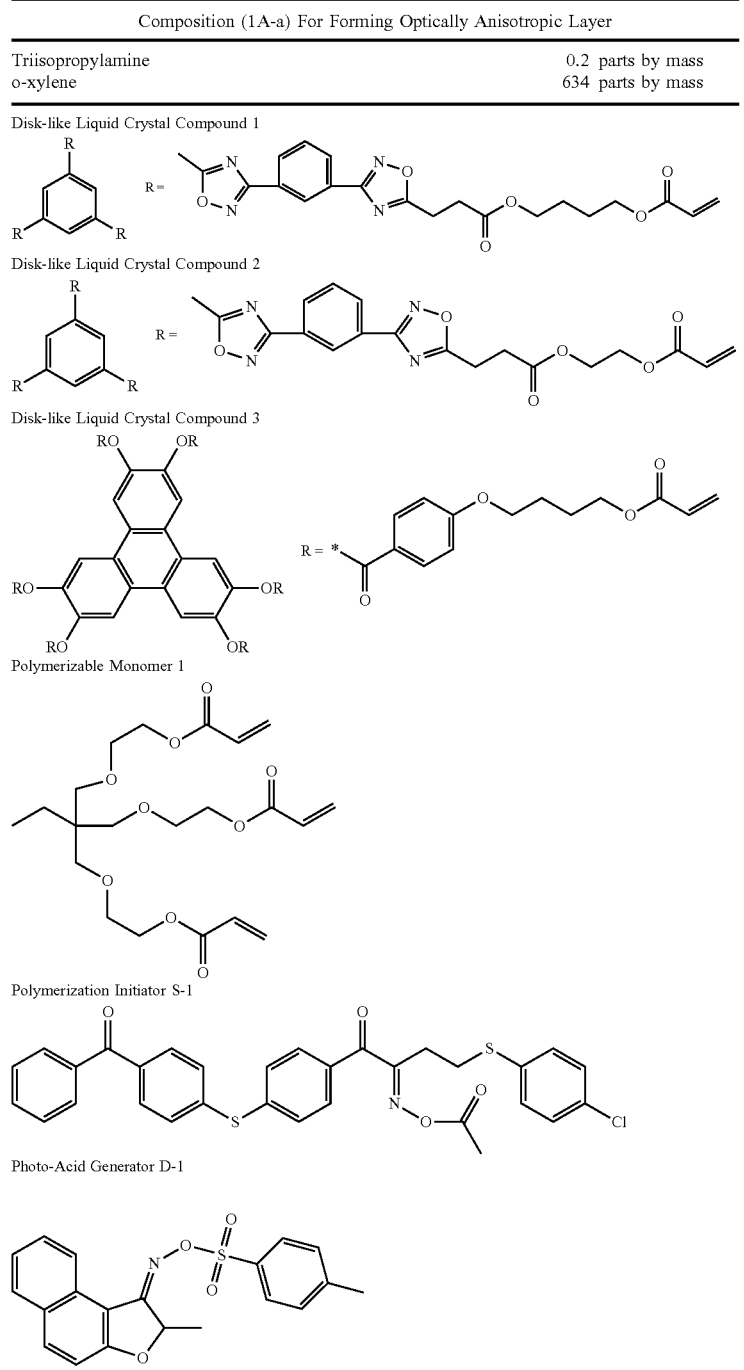

Disk-like Liquid Crystal Compound 1

Disk-like Liquid Crystal Compound 2

Disk-like Liquid Crystal Compound 3

Polymerizable Monomer 1

Polymerization Initiator S-1

Photo-Acid Generator D-1

Next, using a geeser coater, a composition (1A-b) for forming an optically anisotropic layer containing a disk-like liquid crystal compound having the following composition was applied to the optically anisotropic layer (1A-a) produced as described above and heated with hot air at 95° C. for 120 seconds. Subsequently, UV irradiation (100 mJ/cm$^2$) was performed at 95° C. on the obtained composition layer to immobilize the alignment of the liquid crystal compound, thereby forming an optically anisotropic layer (1A-b) corresponding to an upper layer.

The thickness of the optically anisotropic layer (1A-b) was 1.5 μm, and Δnd at a wavelength of 550 nm was 153 nm.

An average tilt angle of a disc plane of the disk-like liquid crystal compound with respect to the surface of the film was 90°, and it was confirmed that the disk-like liquid crystal compound was aligned perpendicular to the surface of the film.

In a case where a width direction of the film was assumed as 0° (longitudinal direction was 90° counterclockwise and −90° clockwise), an in-plane slow axis direction of the optically anisotropic layer (1b) was −14° in a case of being viewed from the optically anisotropic layer (1A-b) side.

| Composition (1A-b) For Forming Optically Anisotropic Layer | |
|---|---|
| Disk-like liquid crystal compound 1 described above | 80 parts by mass |
| Disk-like liquid crystal compound 2 described above | 20 parts by mass |
| Alignment film interface alignment agent 1 shown below | 1.8 parts by mass |
| Polymerizable monomer 1 described above | 10.0 parts by mass |
| Polymerization initiator S-1 (oxime type) described above | 5.0 parts by mass |
| Fluorine-containing compound A shown below | 0.1 parts by mass |
| Fluorine-containing compound B shown below | 0.2 parts by mass |
| Fluorine-containing compound C shown below | 0.1 parts by mass |
| Antifoaming agent 1 shown below | 2.1 parts by mass |
| Methyl ethyl ketone | 419 parts by mass |

Alignment Film Interface Alignment Agent 1

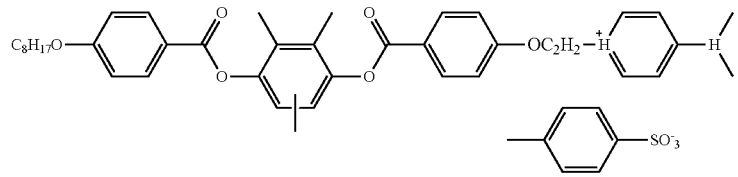

Fluorine-Containing Compound A (in the following formula, a and b represents the content (mass %) of each repeating unit with respect to all repeating units, and a was 90 mass % and b was 10 mass %)

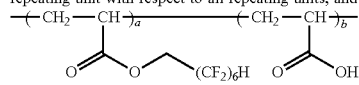

Fluorine-Containing Compound B (numerical value in each repeating unit represents the content with respect to all repeating units)

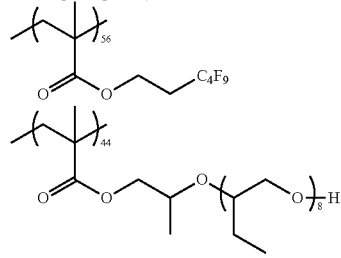

Fluorine-Containing Compound C (numerical value in each repeating unit represents the content with respect to all repeating units)

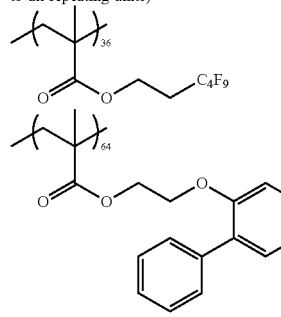

Antifoaming Agent 1

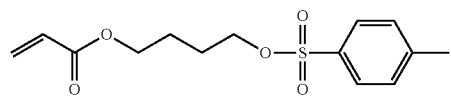

According to the above-described procedure, an optical laminate (1A) in which the optically anisotropic layer (1A-a) and the optically anisotropic layer (1A-b) were directly laminated on the long cellulose acylate film was produced.

Example 2

A photo-alignment polymer P-2 represented by Formula P-2 was synthesized in the same manner as the photo-alignment polymer P-1 synthesized in Example 1, except that a monomer mB-2 represented by Formula mB-2 was used instead of the monomer mB-1. The alphabet described in each repeating unit in Formula P-2 represents the content (mass %) of each repeating unit with respect to all repeating units, and a and b were 53 mass % and 47 mass %, respectively. In addition, the weight-average molecular weight thereof was 100000.

In addition, an optical laminate (2A) was produced in the same manner as in Example 1, except that the photo-alignment polymer P-2 was used instead of the photo-alignment polymer P-1.

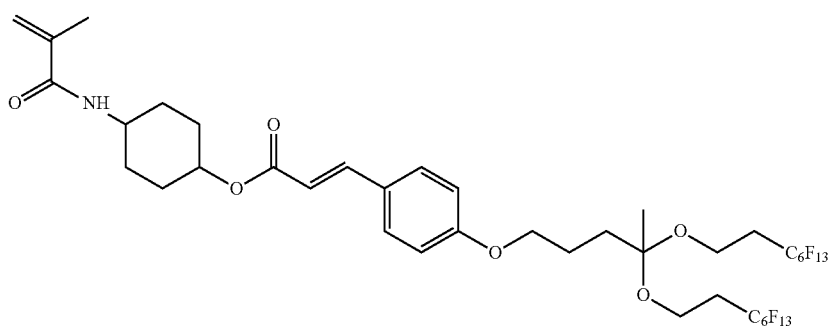

mB-2

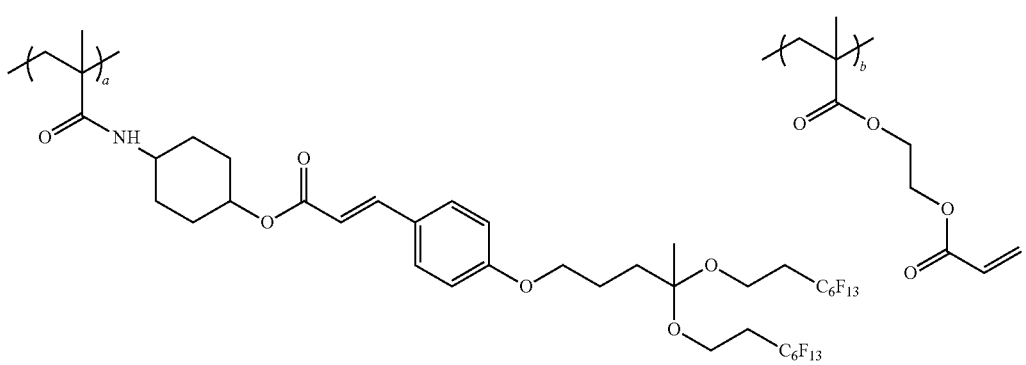

P-2

Example 3

A photo-alignment polymer P-3 represented by Formula P-3 was synthesized in the same manner as the photo-alignment polymer P-1 synthesized in Example 1, except that a monomer mC-5 represented by Formula mC-5 was used instead of the monomer mC-4. The alphabet described in each repeating unit in Formula P-3 represents the content (mass %) of each repeating unit with respect to all repeating units, and a and b were 53 mass % and 47 mass %, respectively. In addition, the weight-average molecular weight thereof was 150000.

In addition, an optical laminate (3A) was produced in the same manner as in Example 1, except that the photo-alignment polymer P-3 was used instead of the photo-alignment polymer P-1.

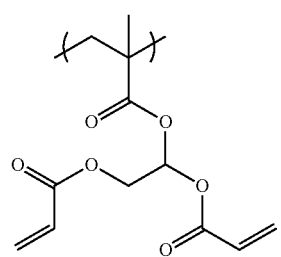

mC-5

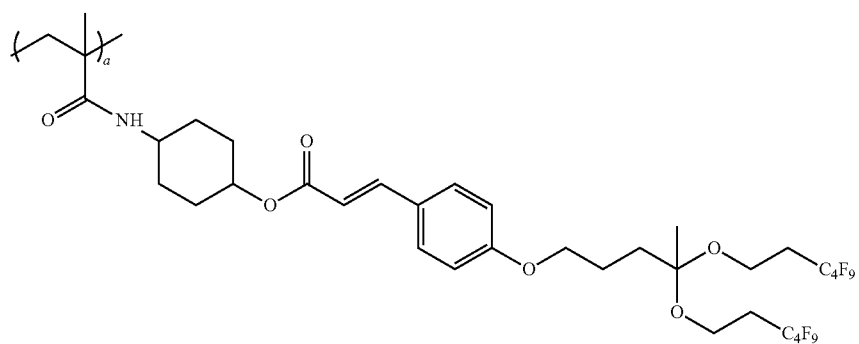

P-3

Example 4

A photo-alignment polymer P-4 represented by Formula P-4 was synthesized in the same manner as the photo-alignment polymer P-1 synthesized in Example 1, except that a monomer mB-3 represented by Formula mB-3 was used instead of the monomer mB-1. The alphabet described in each repeating unit in Formula P-4 represents the content (mass %) of each repeating unit with respect to all repeating units, and a and b were 53 mass % and 47 mass %, respectively. In addition, the weight-average molecular weight thereof was 100000.

In addition, an optical laminate (4A) was produced in the same manner as in Example 1, except that the photo-alignment polymer P-4 was used instead of the photo-alignment polymer P-1.

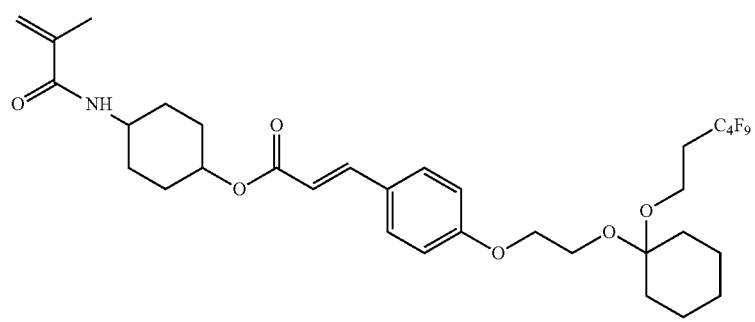

mB-3

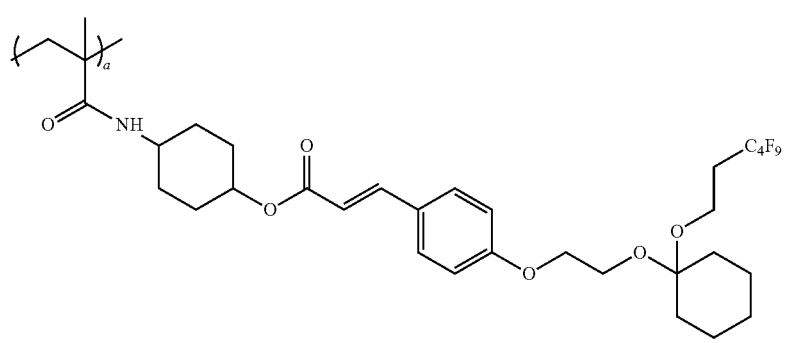

P-4

Comparative Example 1

A photo-alignment polymer H-1 was synthesized in the same manner as in the photo-alignment polymer P-1 synthesized in Example 1. The alphabet described in each repeating unit in Formula H-1 represents the content (mass %) of each repeating unit with respect to all repeating units, and a, b, and c were 37 mass %, 26 mass %, and 37 mass %, respectively. In addition, the weight-average molecular weight thereof was 80000.

In addition, an optical laminate (H1A) was produced in the same manner as in Example 1, except that the photo-alignment polymer H-1 was used instead of the photo-alignment polymer P-1.

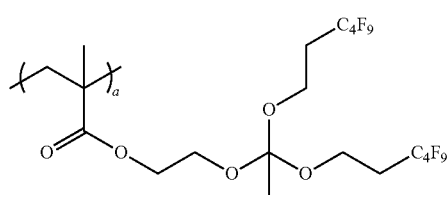

H-1

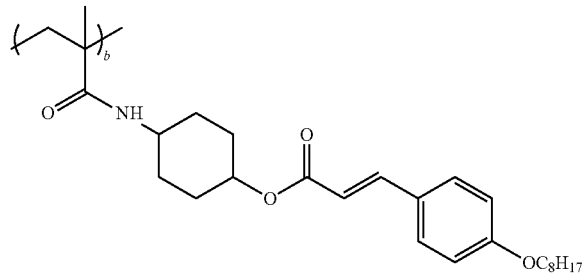

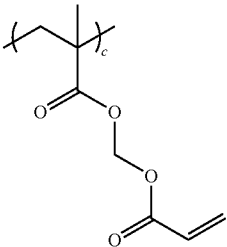

H-1

Comparative Example 2

A photo-alignment polymer H-2 was synthesized in the same manner as in the photo-alignment polymer P-1 synthesized in Example 1. The alphabet described in each repeating unit in Formula H-2 represents the content (mass %) of each repeating unit with respect to all repeating units, and a, b, and c were 37 mass %, 26 mass %, and 37 mass %, respectively. In addition, the weight-average molecular weight thereof was 100000.

In addition, an optical laminate (H2A) was produced in the same manner as in Example 1, except that the photo-alignment polymer H-2 was used instead of the photo-alignment polymer P-1.

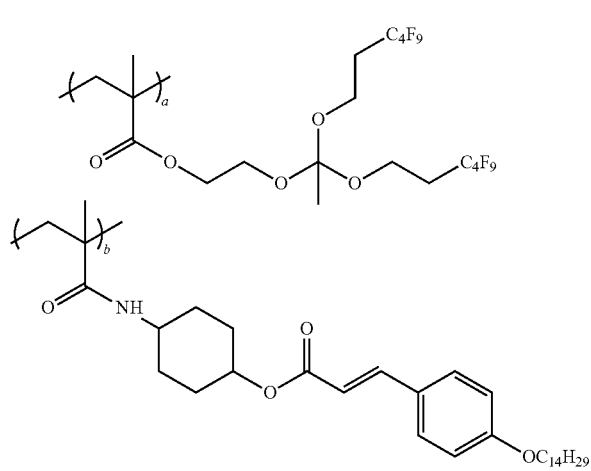

H-2

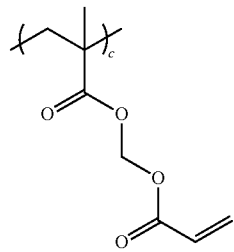

H-2

Comparative Example 3

A photo-alignment polymer H-3 was synthesized in the same manner as in the photo-alignment polymer P-1 synthesized in Example 1. The alphabet described in each repeating unit in Formula H-3 represents the content (mass %) of each repeating unit with respect to all repeating units, and a, b, and c were 40 mass %, 24 mass %, and 36 mass %, respectively. In addition, the weight-average molecular weight thereof was 50000.

In addition, an optical laminate (H3A) was produced in the same manner as in Example 1, except that the photo-alignment polymer H-3 was used instead of the photo-alignment polymer P-1.

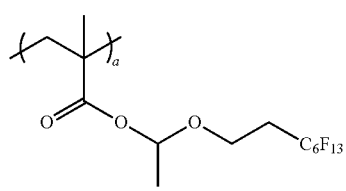

H-3

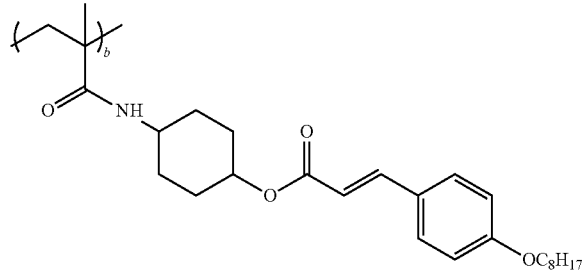

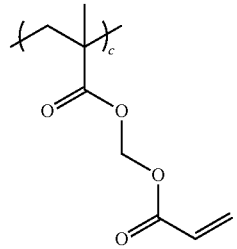

Evaluation

Liquid Crystal Alignment Properties

Two polarizing plates were arranged in crossed nicols, and the produced optical laminate was disposed therebetween to observe the degree of light leakage and to observe the surface state with a polarization microscope. The results are shown in Table 1.

AA: The liquid crystal director is uniformly adjusted and aligned, and the display performance is excellent (No light leakage).

A: There is no disorder of liquid crystal director, and the plane state is stable (Very little light leakage).

B: There is partial disorder of liquid crystal director, and the plane state is stable (Very little light leakage).

C: The liquid crystal director is significantly disordered, the plane state is unstable, and thus the display performance is very poor (Obvious light leakage).

Here, the stable plane state means a state in which defects such as unevenness and alignment failures do not occur in a case where the optical laminate is installed and observed between two polarizing plates in crossed nicol arrangement.

In addition, the liquid crystal director means a vector in a direction (alignment main axis) in which the major axis of liquid crystalline molecules is aligned.

In Table 1, regarding the evaluation of liquid crystal alignment properties, not only the upper layer but also the lower layer was evaluated, but the evaluation of the lower layer was performed using a sample in which an optically anisotropic layer corresponding to the lower layer (binder layer) was formed on a support.

Upper Layer Coating Properties

The surface energy of the produced binder layer (lower layer) was measured by the method shown below, and upper layer coating properties were evaluated based on the following standard. The results are shown in Table 1. For the measurement, a binder layer (lower layer) produced at the annealing temperature shown in Table 1 (115° C./125° C./135° C.) was used.

Measuring Method of Surface Energy

The surface energy of the composition for forming a binder layer (before heating) and the surface energy of the binder layer after heating (measured at heating temperatures of 110° C./120° C./135° C. respectively) after irradiation with 365 nm UV-LED were measured. A contact angle meter ["CA-X" type contact angle meter, manufactured by Kyowa Interface Science Co., Ltd.] was used for the surface energy. The specific measuring method was as follows.

The measurement target was spin-coated on a quartz substrate. In a case of containing a solvent, the film was formed with drying. Subsequently, using the contact angle meter, in a dry state (20° C./65% RH), liquid droplets with a diameter of 1.0 mm were made on a needle tip using pure water as the liquid, and brought into contact with the surface of the above-described spin-coated film to form the liquid droplets on the film. The angle between the tangent line with respect to the liquid surface and the film surface at a point where the film and the liquid come into contact with each other, and the angle on the side including the liquid as the contact angle were measured. In addition, the contact angle was measured using methylene iodide instead of the water, and the surface free energy defined below was obtained.

The surface free energy ($\gamma s^v$: unit, mN/m) was defined as a value $\gamma s^v (=\gamma s^d + \gamma s^h)$ expressed as a sum of $\gamma s^d$ and $\gamma s^h$ determined by the following simultaneous equations a and b, from the contact angles $\theta_{H2O}$ and $\theta_{CH2I2}$ of pure water $H_2O$ and methylene iodide $CH_2I_2$, as determined experimentally on an antireflection film, with reference to D. K. Owens: J. Appl. Polym., Sci., 13, 1741 (1969).

a. $1+\cos \theta_{H2O} = 2\sqrt{\gamma s^d}(\sqrt{\gamma_{H2O}^d}/\sqrt{\gamma_{H2O}^v}) + 2\sqrt{\gamma s^h}(\sqrt{\gamma_{H2O}^h}/\sqrt{\gamma_{H2O}^v})$ b. $1+\cos \theta_{CH2I2} = 2\sqrt{\gamma s^d}(\sqrt{\gamma_{CH2I2}^d}/\sqrt{\gamma_{CH2I2}^v}) + 2\sqrt{\gamma s^h}(\sqrt{\gamma_{CH2I2}^h}/\sqrt{\gamma_{CH2I2}^v})$ $\gamma_{H2O}^d = 21.8$, $\gamma_{H2O}^h = 51.0$, $\gamma_{H2O}^v = 72.8$ $\gamma_{CH2I2}^d = 49.5$, $\gamma_{CH2I2}^h = 1.3$, $\gamma_{CH2I2}^v = 50.8$ Evaluation Standard A: difference in surface energy was 20 mN/m or more B: difference in surface energy was 10 mN/m or more and less than 20 mN/m C: difference in surface energy was less than 10 mN/m

TABLE 1

| | Photo-alignment polymer | | Liquid crystal alignment properties | | Upper layer coating properties | | |
|---|---|---|---|---|---|---|---|
| | Type | Weight-average molecular weight | Lower layer | Upper layer | 115° C. | 125° C. | 135° C. |
| Example 1 | P-1 | 110000 | AA | AA | A | A | A |
| Example 2 | P-2 | 100000 | AA | AA | B | A | A |

TABLE 1-continued

| | Photo-alignment polymer | | Liquid crystal alignment properties | | Upper layer coating properties | | |
|---|---|---|---|---|---|---|---|
| | Type | Weight-average molecular weight | Lower layer | Upper layer | 115° C. | 125° C. | 135° C. |
| Example 3 | P-3 | 150000 | AA | AA | A | A | A |
| Example 4 | P-4 | 100000 | AA | B | A | A | A |
| Comparative Example 1 | H-1 | 80000 | A | C | A | A | A |
| Comparative Example 2 | H-2 | 100000 | AA | C | A | A | A |
| Comparative Example 3 | H-3 | 50000 | A | C | C | A | A |

From the results shown in Table 1, in a case of using a photo-alignment polymer which did not have the repeating unit represented by Formula (1) described above and had separately the repeating unit including an acid-cleavage group corresponding to Formulae (B1) and (B2) described above and the repeating unit including a photo-aligned group, it was found that the liquid crystal alignment properties of the upper layer were deteriorated (Comparative Examples 1 to 3). In addition, in Comparative Example 3, in a case of forming the lower layer (binder layer) at 115° C., it was found that the upper layer coating properties were deteriorated.

On the other hand, in a case of using a photo-alignment polymer having the repeating unit represented by Formula (1) described above, it was found that the liquid crystal alignment properties of the upper layer were improved, and the upper layer coating properties were also improved (Examples 1 to 4).

In addition, from a comparison between Example 1 and Example 4, in a case where A in Formula (1) described above was the acid-cleavage group represented by Formula (B1) described above, it was found that the liquid crystal alignment properties were more improved.

What is claimed is:

1. A photo-alignment polymer comprising a repeating unit represented by Formula (1),

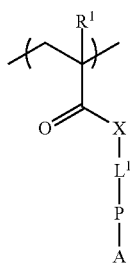
(1)

in Formula (1),
R$^1$ represents a hydrogen atom or a substituent,
X represents —O—, —S—, or —NR$^2$—, in which R$^2$ represents a hydrogen atom or a substituent,
L$^1$ represents a single bond or a divalent linking group,
P represents a photo-aligned group, and
A represents an acid-cleavage group represented by Formula (B1) or (B2), which is decomposed by an action of acid to produce a polar group,

(B1)

(B2)

in Formulae (B1) and (B2),
* represents a bonding position,
L$^{b1}$ and L$^{b2}$ each independently represent a single bond or a divalent linking group,
Y represents a group containing a fluorine atom or a silicon atom, where two Y's in Formula (B1) may be the same or different from each other, and
R$^{b1}$ and R$^{b2}$ each independently represent a hydrogen atom or a substituent, where two R$^{b2}$'s in Formula (B2) may be the same or different from each other, and may be bonded to each other to form a ring.

2. The photo-alignment polymer according to claim 1, wherein the repeating unit represented by Formula (1) is a repeating unit represented by Formula (2),

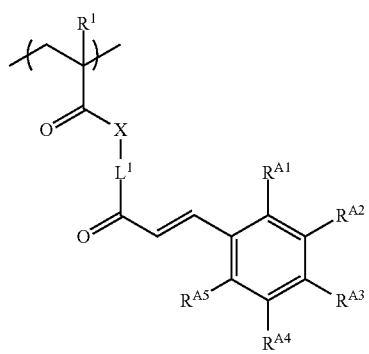
(2)

in Formula (2),
R$^1$ represents a hydrogen atom or a substituent,
X represents —O—, —S—, or —NR$^2$—, in which R$^2$ represents a hydrogen atom or a substituent,
L$^1$ represents a single bond or a divalent linking group, and
R$^{A1}$, R$^{A2}$, R$^{A3}$, R$^{A4}$, and R$^{A5}$ each independently represent an acid-cleavage group represented by Formula (B1) or (B2), a hydrogen atom, or a substituent, where at least one of $R^{A1}$, $R^{A2}$, $R^{A3}$, $R^{A4}$, or $R^{A5}$ represents the acid-cleavage group represented by Formula (B1) or (B2).

3. The photo-alignment polymer according to claim 1, further comprising a repeating unit having a crosslinkable group.

4. The photo-alignment polymer according to claim 3, wherein the repeating unit having a crosslinkable group is a repeating unit represented by Formula (C),

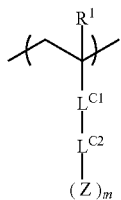
(C)

in Formula (C), $R^{C1}$ represents a hydrogen atom or a substituent, $L^{C1}$ represents a single bond or a divalent linking group, $L^{C2}$ represents an (m+1)-valent linking group, Z represents a crosslinkable group, and m represents an integer of 1 or more, in which in a case of being an integer of 2 or more, a plurality of Z's may be the same or different from each other.

5. The photo-alignment polymer according to claim 3, wherein the crosslinkable group represents a group represented by any one of Formula (C1), . . . or Formula (C4),

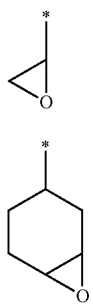

(C1)

(C2)

-continued

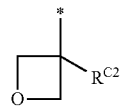
(C3)

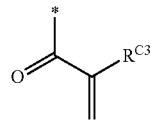
(C4)

in Formulae (C1) to (C4), * represents a bonding position, in Formula (C3), $R^{C2}$ represents a hydrogen atom, a methyl group, or an ethyl group, and in Formula (C4), $R^{C3}$ represents a hydrogen atom or a methyl group.

6. The photo-alignment polymer according to claim 3, wherein a content a of the repeating unit represented by Formula (1) and a content b of the repeating unit having a crosslinkable group satisfy Expression (D1) in terms of mass ratio, $$0.03 \leq a/(a+b) \leq 0.8 \qquad (D1).$$

7. The photo-alignment polymer according to claim 1, wherein a weight-average molecular weight is 10000 to 500000.

8. A binder composition comprising:
the photo-alignment polymer according to claim 1;
a binder; and
a photo-acid generator.

9. A binder layer formed of the binder composition according to claim 8,
wherein a surface has an alignment controllability.

10. An optical laminate comprising:
the binder layer according to claim 9; and
an optically anisotropic layer disposed on the binder layer.

11. An optical laminate manufacturing method comprising:
generating an acid from the photo-acid generator in a coating film formed of the binder composition according to claim 8, performing a photo-alignment treatment, and then forming a binder layer; and
performing coating on the binder layer with a polymerizable liquid crystal composition including a polymerizable liquid crystal compound, and then forming an optically anisotropic layer.

12. An image display device comprising:
the binder layer according to claim 9.

13. An image display device comprising:
the optical laminate according to claim 10.

* * * * *